(12) United States Patent
Zhang et al.

(10) Patent No.: US 9,725,621 B2
(45) Date of Patent: Aug. 8, 2017

(54) CHEMICAL MECHANICAL PLANARIZATION SLURRY COMPOSITION COMPRISING COMPOSITE PARTICLES, PROCESS FOR REMOVING MATERIAL USING SAID COMPOSITION, CMP POLISHING PAD AND PROCESS FOR PREPARING SAID COMPOSITION

(71) Applicant: Cabot Corporation, Boston, MA (US)

(72) Inventors: Qingling Zhang, Bloomfield Hills, MI (US); Bennett Greenwood, Somerville, MA (US); Ravi Sharma, Acton, MA (US); Geoffrey D. Moeser, Groton, MA (US); Brian G. Prevo, Portland, OR (US); Mark J. Hampden-Smith, Chelmsford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/787,989

(22) PCT Filed: Apr. 30, 2014

(86) PCT No.: PCT/US2014/036093
§ 371 (c)(1),
(2) Date: Oct. 29, 2015

(87) PCT Pub. No.: WO2014/179419
PCT Pub. Date: Nov. 6, 2014

(65) Prior Publication Data
US 2016/0090513 A1    Mar. 31, 2016

Related U.S. Application Data

(60) Provisional application No. 61/819,229, filed on May 3, 2013, provisional application No. 61/919,251, filed (Continued)

(30) Foreign Application Priority Data

Mar. 18, 2014    (WO) .............. PCT/US2014/031078

(51) Int. Cl.
*B44C 1/22*    (2006.01)
*C09G 1/02*    (2006.01)
(Continued)

(52) U.S. Cl.
CPC .............. *C09G 1/02* (2013.01); *B24B 37/044* (2013.01); *C09K 3/1409* (2013.01); *C09K 3/1463* (2013.01)

(58) Field of Classification Search
USPC ...................................... 216/53, 89; 438/689
See application file for complete search history.

(56) References Cited

U.S. PATENT DOCUMENTS 3,544,500 A    12/1970 Osmond et al.
4,421,660 A    12/1983 Solc nee Hajna
(Continued)

FOREIGN PATENT DOCUMENTS

EP    0104498 A2    4/1984
EP    0505230 A1    9/1992
(Continued)

OTHER PUBLICATIONS

Notification of Transmittal of the International Search Report and the Written Opinion of the International Searching Authority, or the Declaration of International Patent Application No. PCT/US2014/031078, mailed on Aug. 6, 2014.
(Continued)

*Primary Examiner* — Roberts Culbert

(57) ABSTRACT

CMP processes, tools and slurries utilize composite particles that include core particles having organosilica particles disposed about the core particles. Using these processes,
(Continued)

tools and slurries can enhance removal rates, reduce defectivity and increase cleanability with respect to comparable systems and substrates.

28 Claims, 14 Drawing Sheets

Related U.S. Application Data on Dec. 20, 2013, provisional application No. 61/919,215, filed on Dec. 20, 2013.

(51) Int. Cl.
    *B24B 37/04*     (2012.01)
    *C09K 3/14*     (2006.01)

(56) References Cited

U.S. PATENT DOCUMENTS

| | | |
|---|---|---|
| 4,608,401 A | 8/1986 | Martin |
| 4,981,882 A | 1/1991 | Smith et al. |
| 5,223,365 A | 6/1993 | Yamamoto et al. |
| 6,756,437 B1 | 6/2004 | Xue et al. |
| 6,833,401 B1 | 12/2004 | Xue et al. |
| 7,094,830 B2 | 8/2006 | Xue et al. |
| 8,703,374 B2 | 4/2014 | Sweeney et al. |
| 8,846,285 B2 | 9/2014 | Chiba et al. |
| 8,871,844 B2 | 10/2014 | Hashemzadeh |
| 2002/0142242 A1 | 10/2002 | Inoue |
| 2007/0075291 A1 | 4/2007 | Paik et al. |
| 2007/0160925 A1 | 7/2007 | Koido |
| 2007/0189944 A1 | 8/2007 | Kirkland |
| 2010/0213131 A1 | 8/2010 | Linford |
| 2011/0021666 A1 | 1/2011 | Nishi |
| 2011/0236812 A1 | 9/2011 | Ishihara |
| 2011/0287247 A1 | 11/2011 | Kawasaki et al. |
| 2011/0318584 A1 | 12/2011 | Yoshikawa |
| 2012/0058425 A1 | 3/2012 | Shu |
| 2013/0101934 A1 | 4/2013 | Chiba |
| 2013/0137029 A1 | 5/2013 | Kadonome |
| 2013/0316281 A1 | 11/2013 | Cheng |
| 2014/0051250 A1 | 2/2014 | Minami et al. |
| 2014/0113226 A1 | 4/2014 | Ishii et al. |

FOREIGN PATENT DOCUMENTS

| | | |
|---|---|---|
| EP | 0572128 B1 | 7/1998 |
| EP | 1138733 A2 | 10/2001 |
| EP | 2386590 A1 | 11/2011 |
| GB | 2227739 A | 8/1990 |
| JP | 1993/214054 A | 8/1993 |
| JP | 1993/239340 A | 9/1993 |
| JP | 1993/239341 A | 9/1993 |
| JP | 1994/211961 A | 8/1994 |
| KR | 10-2010-0075235 | 7/2010 |
| WO | WO 2008/052216 | 5/2008 |
| WO | WO 2013/063291 A1 | 5/2013 |

OTHER PUBLICATIONS

Notification of Transmittal of the International Search Report and the Written Opinion of the International Searching Authority, or the Declaration of International Patent Application No. PCT/US2014/036093, mailed on Sep. 4, 2014.

Vogel, N., et al., "Platinum Nanoparticles from Size Adjusted Functional Colloidal Particles Generated by a Seeded Emulsion Polymerization Process", Beilstein Journal of Nanotechnology, 2011, vol. 2, pp. 459-472.

Fukuri, N., et al., "Control of the Morphology of Dispersed Crystalline Polyester in a Toner for Low-Energy Fusing", Journal of Imaging Science and Technology, 2011, vol. 55(1), pp. 010509-010509-8.

Chung, K., et al., "Preparation of Copoly(styrene/butyl methacrylate) Beads and Composite Particles Containing Carbon Black with Hydrophobic Silica as a Stabilizer in Aqueous Solution", Elastomers and Composites, 2012, vol. 47(1), pp. 43-53.

Notification of Transmittal of International Preliminary Report on Patentability (Chapter I of the Patent Cooperation Treaty) of International Patent Application No. PCT/US2014/036093, mailed on Nov. 12, 2015.

100 nm 100 nm

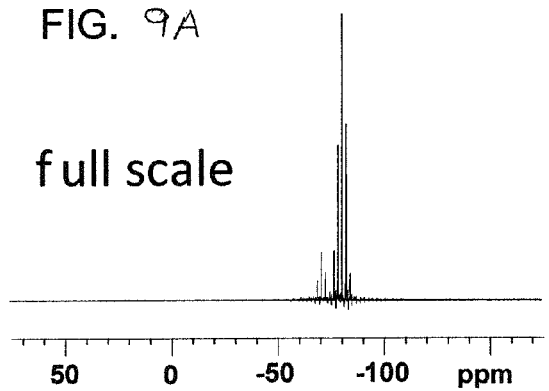
FIG. 9A
full scale
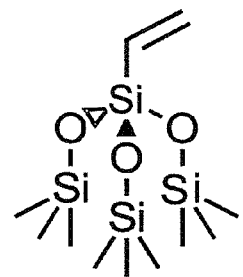
FIG. 9B
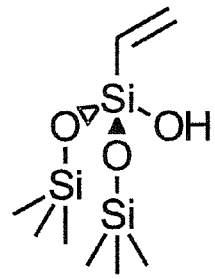
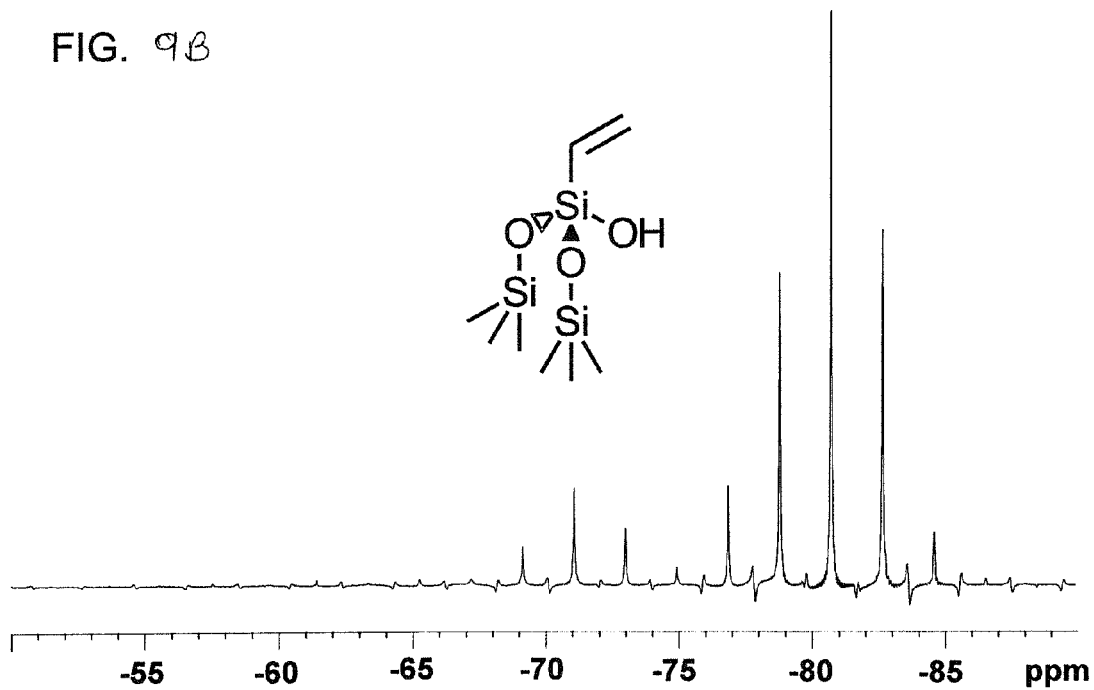

100 nm

CHEMICAL MECHANICAL PLANARIZATION SLURRY COMPOSITION COMPRISING COMPOSITE PARTICLES, PROCESS FOR REMOVING MATERIAL USING SAID COMPOSITION, CMP POLISHING PAD AND PROCESS FOR PREPARING SAID COMPOSITION

CROSS-REFERENCE TO RELATED APPLICATIONS

This application is a national phase application of PCT/US2014/036093 filed on Apr. 30, 2014. The '093 application claims the benefit of the following applications, the entire contents of which are incorporated herein by reference; U.S. Provisional Patent Application 61/819,229, filed on May 3, 2013, U.S. Provisional Patent Application 61/919,215, filed on Dec. 20, 2013, and U.S. Provisional Patent Application No. 61/919,251, filed on Dec. 20, 2013, and PCT Application No. PCT/US2014/031078, filed on Mar. 18, 2014 the entire contents of all of which are incorporated herein by reference.

BACKGROUND OF THE INVENTION

Mixed phase particles including an organic phase and an inorganic phase have found utility in a wide variety of applications. When such particles are themselves used in polymer composites, it is desirable that they include surface roughness to enhance their interaction with the surrounding matrix and that their polymer cores be able to mitigate crack propagation. For example, it may be desirable that the organic core be soft (e.g., a polymer with a low glass transition temperature) or resilient. Alternatively or in addition, it may be desirable that the organic phase include polymer chains that are not highly cross-linked, as evidenced by a melting temperature or glass transition temperature. When such mixed phase particles are used as toner additives, it is desirable that such particles have surface roughness that facilitates multiple points of contact with the toner particle. The reduced density of mixed phase particles with respect to the neat inorganic material can reduce drop-off from the toner surface.

In addition, it is desirable to have a flexible method for producing mixed phase particles that may be used with a wide variety of chemistries, e.g., a generic approach that may be used for a range of polymer and other organic core materials.

Chemical mechanical planarization, also known as CMP is a technique used to planarize the top surface of an in-process semiconductor wafer or other substrates in preparation of subsequent steps or for selectively removing material according to its position. Both chemical and mechanical actions are generally involved.

CMP is commonly used in microelectronic integrated circuit (IC) fabrication. ICs are multilayered structures comprised of dielectric and conductive layers that are also patterned laterally in order to isolate different devices and functions. Each layer is deposited sequentially and then polished/removed by CMP to a desired depth prior to the deposition of the next layer in the sequence. Once a layer has been processed by CMP, it can undergo a post CMP cleaning operation that typically includes exposure (e.g., for a few minutes) at a cleaning station during which ammonium hydroxide solutions flow over a wafer surface with gentle polymer brush scrubbing action followed by forced air or infrared heat drying. Typically, the cleaning operations are followed by metrology steps to measure film thickness by either optical methods (e.g., ellipsometry) for oxide layer or by electrical impedance techniques for metallic layers (e.g., four point probe measurements).

CMP can be used to planarize a surface to nanometer and sometimes angstrom levels of smoothness in order to maximize the fidelity and quality of the pattern deposited in the next layer. CMP is necessary after nearly every material deposition step (eg. conductive metal, metal barrier, or oxide insulator layers as examples).

Removal rate is a key feature for CMP as it dictates the speed at which a given CMP step can be conducted. Also important are considerations related to workpiece defects such as those caused by scratching, dishing of metal features, oxide erosion and so forth. Since defective workpieces often need to be re-processed or discarded, their occurrence has a major impact on the costs and efficiency of the overall manufacturing process.

Typical CMP operations involve the cyclic motion of a polishing pad and a workpiece in the presence of a slurry that has abrasive and/or corrosive properties. In semiconductor manufacturing, for instance, a wafer is mounted on carrier and pressed down on a rotating platen holding a compliant polishing pad. Slurry is dispensed at the interface between wafer and pad and wafer material is removed by the combined actions of the chemical slurry and abrasive properties of the pad. The rotation of the head, coupled with the motion of the pad and its topography serves to introduce the wafer to a continuous flow of fresh slurry.

Generally, CMP polishing pads are considerably larger than the workpiece and are fabricated from polymeric materials that can include certain features, such as, for example, micro-texture for retaining the slurry on the pad. Polishing pad properties can contribute to within die (WID) thickness uniformity and within wafer (WIW) planarization uniformity. As described in U.S. Pat. No. 6,572,439, issued on Jun. 3, 2003 to Drill et al., for many CMP processes using a harder, less compressible polishing pad can lead to an increase in WID thickness uniformity but a reduction in WIW planarization uniformity, whereas a softer, more compressible pad can have the opposite effects. Such inconsistencies can be further exacerbated on larger (e.g., 300 to 450 mm) wafer scales.

With use, the working surface of the pad can become eroded. Polishing debris can get trapped in the surface micro-channels, clogging them. A conditioning or "dressing" operation can be performed (with a conditioning tool, often a diamond containing abrasive conditioning pad) to remove the glazed layer and expose a fresh polishing surface for contacting the workpiece.

CMP slurries generally contain abrasive particles, often in conjunction with other materials, in an aqueous medium. The type and properties of the abrasive can be selected by taking into account the material being planarized, desired surface finish (expressed, for example, in terms "out of flatness" or as Ra values) and other criteria. Exemplary abrasive particles that can be utilized include but are not limited to silica, alumina, ceria, zirconia, silicon carbide, and others. The abrasive particles can have characteristics that enhance slurry performance during CMP (e.g., with respect to removal rates, reliability, reproducibility or number of defects). U.S. Pat. No. 7,037,451, issued to Hampden-Smith et al. on May 2, 2006 and incorporated herein by reference in its entirety, for example, describes CMP slurries that contain abrasive particles that have a small particle size, narrow size distribution, a spherical morphology and are substantially unagglomerated.

Typical silica-containing CMP slurries use fumed silica of low surface area (90 m2/g), such as Cab-O-Sil™ L-90 fumed silica (nominal specific surface area of 90 m2/g), in concentrations ranging from 5 to 15 wt % or colloidal silica (also referred to herein as sol gel silica) of similar surface areas and loadings. Often higher loadings of colloidal silica slurries are required to achieve comparable CMP material removal rates. For example, in oxide or interlayer dielectric (ILD) CMP polishing, the typical loading is 10-12% wt for fumed silica in the slurry. By comparison, typical colloidal silica loadings for comparable ILD polishing slurries would be 25-30% wt (e.g. for example, Klebesol 1501 silica slurry).

The concentration and size of the particle largely dictates the removal rate, particularly for ILD CMP steps. Lower specific surface area particles (e.g. larger diameter particles) provide an advantage over other smaller particles (higher surface area) in terms of removal rate. However, defectivity (often expressed as the number of scratches) also increases with particle size and can reduce device yield by ultimately causing chip failures that are not detected until fabrication is completed. While decreasing the loading of particles can reduce defectivity, it also reduces removal rate, since removal rate scales with particle loading. Rate accelerating chemistry packages, sometimes called accelerators, added to the slurry can help augment removal rate, allowing the usage of smaller particles and reduced loadings to match removal rate and reduce defectivity. Smaller particles, however, are also more difficult to detect during post CMP metrology steps (e.g. defectivity measurements), and they are more difficult to remove by cleaning operations that follow CMP. These residual particles pose the threat of greater defectivity and lost yield, as subsequently deposited layers in the IC architecture trap the defect residual particle, which can ultimately cause performance issues in the final product. The size of the primary particle in a fumed aggregate or colloidal particle can also influence removal rate.

To address advances in electronic components, increasingly complex demands are being placed on CMP processes, materials and equipment utilized to planarize semiconductor, optical, magnetic or other types of substrates. A need continues to exist for CMP slurries and pads that can provide good removal rates, good WIW planarization uniformity, good WID thickness uniformity, low dishing and/or erosion, reduced scratching and residual particle debris, lowered conditioning requirements, prolonged service life, coupled with good selectivity and easy cleanability to help break some of the performance tradeoffs described above.

BRIEF SUMMARY OF THE INVENTION

Composite particles comprising core particles having organosilica particles disposed about the core particles provide a way to combine the benefits of large and small sizes as well as softer and harder materials in a single composite particle that can be formulated into a slurry to help break CMP performance trade-offs. Process benefits are also expected for CMP polishing pads that incorporate such composite particles.

For example, composite particles can break the removal rate/defectivity trade-off described above for metal oxide abrasive particles. The actual abrasive components of the composite particles will have similar contact areas as when metal oxide particles are used alone. Additionally, the composite particles will have multiple abrasive contact points per particle; hence, removal rate per loading should match or exceed previous levels. Removal rates measured by film thickness or mass loss should be improved by 0-25%, or perhaps as much as 0-50%, for comparable systems and substrates.

Composite particles also provide a significant benefit in reduced defectivity. Without being bound by any particular theory, it is expected that the reduced modulus of the polymer core relative to the organosilica coupled with the multiple, smaller organosilica contact points during CMP will relieve points of excessive pressure upon the substrate which should also reduce scratch-like defectivity. It is anticipated that defectivity counts measured by known post CMP metrology tests could be reduced by 10-90%.

Moreover, the larger composite particles can facilitate post CMP cleaning (relative to metal oxide particles alone) as they will present a larger hydrodynamic diameter and viscous drag to cleaning media, while reducing adhesion to the substrate. The abrasive contact points will also lift the center of mass (of the composite particles) upward with respect to the surface being polished, reducing the contact area per volume of composite particle, thus facilitating removal during post-CMP cleaning. Additionally, because the particles are a composite of polymeric and organosilica materials, the net density of the particles is lower than that of pristine metal oxide components, further improving their ability to remain stable in dispersion, and reducing their resistance to changes in direction via fluid convection or inertia. Thus residual particle counts on the work surface as measured by post CMP microscopy or profilometry could be reduced by 20-100%.

Inorganic materials or particles can be selected to offer increased hardness, increased removal rate, improved selectivity to removing certain substrates such as surface nitrides, metals, metal barrier layers, or oxides relative to the other surface layers being polishing by CMP, or other benefits. The mass loading of that abrasive component utilized in a composite particle slurry is expected to be reduced by 10-60% relative to metal oxide abrasives alone in slurries because the abrasive can be bound to the periphery of a core particle that occupies a larger volume, thereby more effectively distributing and utilizing the inorganic materials. Additionally, the reduced density of the organic core relative to the inorganic materials embedded in its surface will reduce the net density of the composite particles relative to inorganic abrasive materials. Thus, reduced mass loadings of the composite abrasives may yield equivalent or greater removal rates to with respect to the corresponding abrasive-only slurry compositions.

In one aspect, a process for removing material from a substrate through chemical and abrasive actions includes removing material from a substrate with a polishing pad or slurry composition, wherein the polishing pad, or the slurry composition, or both composite particles comprising core particles having organosilica particles disposed about the core particles. In another aspect, a CMP slurry composition comprising composite particles comprising core particles having organosilica particles disposed about the core particles dispersed in an aqueous media. In another aspect, a CMP polishing pad comprising composite particles comprising core particles having organosilica particles disposed about the core particles.

In any of the above aspects, the core particles may include an organic material, for example, polyesters, polyurethanes, polyester-styrene copolymers or blends, polyester-acrylic copolymers or blends, styrene-acrylics, or acrylic resins. The organic material may further comprise a polymerized ethylenically unsaturated monomer, for example, styrene or methacryloxypropyltrimethoxysilane.

In any of the above aspects, the organosilica particles may be derived via reaction of an organosilane compound. The organosilane compound may have a formula: $R^1SiR^2_3$, wherein $R^1$ is $C_1$-$C_4$ alkyl or $C_2$-$C_4$ alkenyl or alkynyl, and wherein $R^2$ is alkoxy, chloro, bromo, or iodo, for example, vinyltrimethoxysilane, allyltrimethoxysilane, trimethoxymethylsilane, or trimethoxypropylsilane.

In any of the above aspects, the composite particles may have a roundness R of from 1.1 to 2.0, e.g., 1.15 to 1.6 or 1.2 to 1.6, wherein the roundness is determined by the formula: $R=P^2/(4\pi S)$ wherein P is the perimeter of a cross-section of the particle and wherein S is the cross-sectional area of the particle.

In any of the above aspects, the composite particles may further comprise metal particles or metal oxide particles disposed within the core particles, which metal or metal oxide particles may be surface-treated with a hydrophobizing agent.

In any of the above aspects, the composite particles may further include one or more ingredients selected from the group consisting of a CMP chemical etchant, a CMP processing accelerator, and a CMP passivating agent. The CMP slurry composition may further comprise a surfactant, a rheological agent, a corrosion inhibitor, an oxidizing agent, a chelating agent, a complexing agent, particles other than the metal oxide-polymer composite particles, or any combination thereof.

In another embodiment, a process for preparing composition for CMP includes preparing composite particles and formulating them into a CMP composition. The composite particles are prepared by:

(a) providing an aqueous dispersion comprising polymer particles and a surface agent, the aqueous dispersion having a pH of 8 or more, (b) adding an aqueous mixture comprising an at least partially hydrolyzed organosilane compound to the aqueous dispersion to form a mixture, wherein the organosilane compound has a formula: $R^1SiR^2_3$, wherein $R^1$ is $C_1$-$C_4$ alkyl or $C_2$-$C_4$ alkenyl and wherein $R^2$ is alkoxy, chloro, bromo, or iodo, and (c) forming the aqueous dispersion of composite particles via production of organosilica particles by a reaction of the at least partially hydrolyzed organosilane compound.

Providing may include adjusting the pH of an aqueous dispersion comprising polymer particles and a surface agent to a pH of 8 or more. Alternatively or in addition, providing may comprise combining an aqueous dispersion of polymer particles with an ethylenically unsaturated monomer, allowing the monomer to migrate into the polymer particles, and polymerizing the monomer. Alternatively or in addition, providing may comprise dissolving a polymer in solvent, adding water to form an oil in water emulsion, and distilling the solvent from the emulsion to form an aqueous dispersion of polymer particles.

Dissolving may comprise dissolving the polymer and an ethylenically unsaturated monomer in the solvent. Alternatively or in addition, dissolving may comprise dissolving the polymer and the surface agent in the solvent. The surface agent may be added to the aqueous dispersion after distilling the solvent.

After distilling, the method may further comprise adding an ethylenically unsaturated monomer to the emulsion, allowing the monomer to migrate into the polymer particles, and polymerizing the monomer.

Alternatively or in addition, the method may further comprise polymerizing the surface agent. The surface agent may comprise polyethylene glycol-based polymer, quaternary amine-based organic compound, polyvinylpyrrolidone- or polypyrrolidone-based surfactant, or an anionic surfactant with a sulfate anionic component. The surface agent may comprise $SiH_{3-x}R^3_xR^4Q$, where x is 1, 2, or 3, $R^3$ is alkoxy, or chloro, bromo, or iodo, $R^4$ is $C_3$-$C_{22}$ branched or unbranched alkylene or alkenylene or aromatic group and optionally includes an ether, ester, or amine linkage, and Q is H, Cl, Br, F, hydroxyl, carboxylic acid, epoxy, amine, or a substituted or unsubstituted vinyl, acrylate, or methacrylate. For example, the surface agent may be methacryloxypropyltrimethoxysilane.

The method may further comprise a step (d) of purifying the aqueous dispersion of composite particles. Purifying may comprise diafiltering the aqueous dispersion of composite particles.

The aqueous dispersion in any step may further comprise an ethylenically unsaturated monomer. The process may further comprise a step of crosslinking the ethylenically unsaturated monomer to crosslink the polymer particles.

Alternatively or in addition, the process may further comprise a step (f) of drying the aqueous dispersion.

BRIEF DESCRIPTION OF THE SEVERAL VIEWS OF THE DRAWING(S)

FIG. 9A is a CP/CPMG/MAS $^{29}$Si NMR spectrum of composite particles produced according to Example 4; FIG. 9B is a detail of the spectrum of FIG. 9A.

Figure 12A:
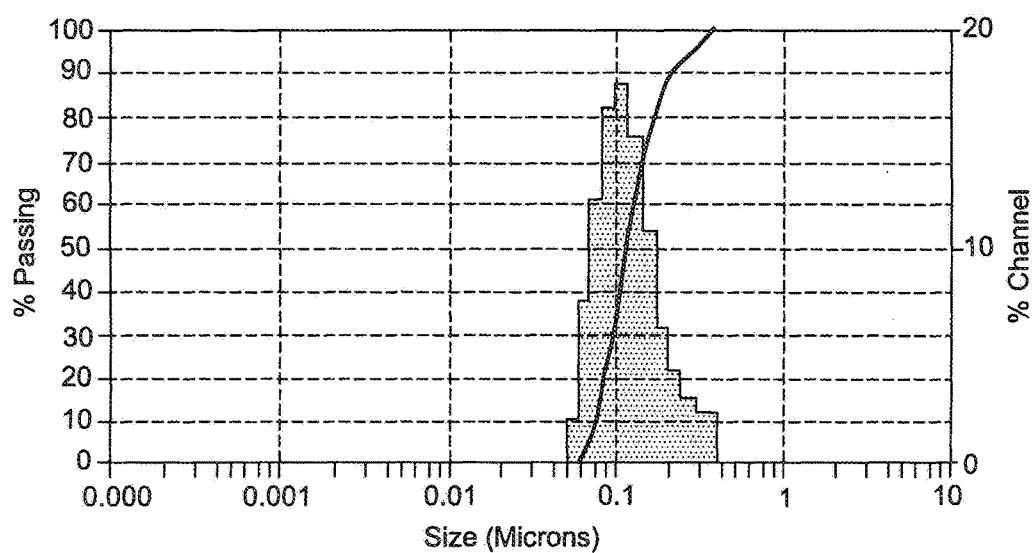
Figure 12B:
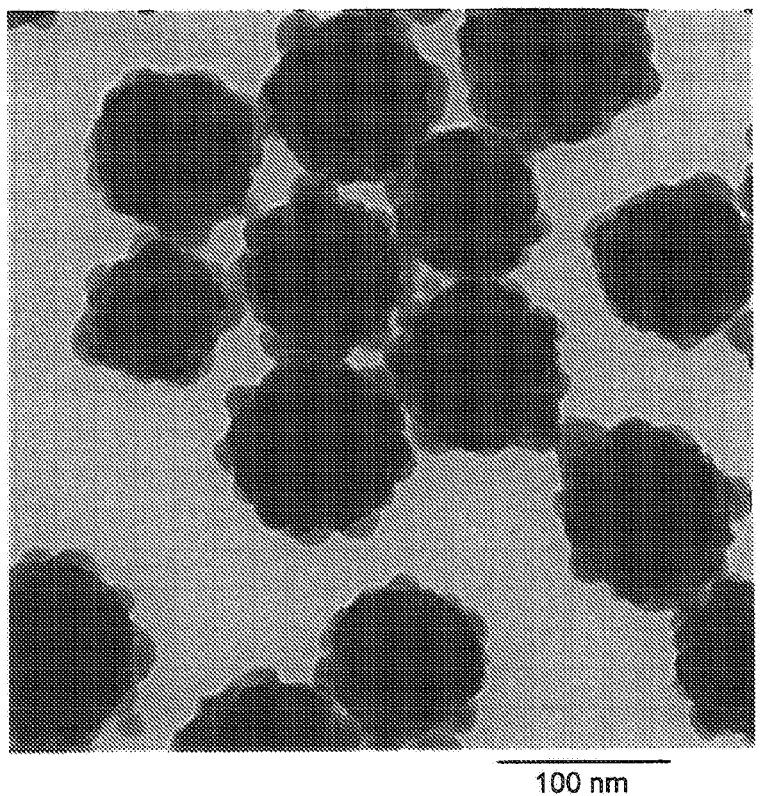

FIG. 12 includes the particle size distribution (FIG. 12A) and transmission electron micrograph (FIG. 12B) of composite particles described in Example 7 according to an embodiment of the invention.

Figure 12C:
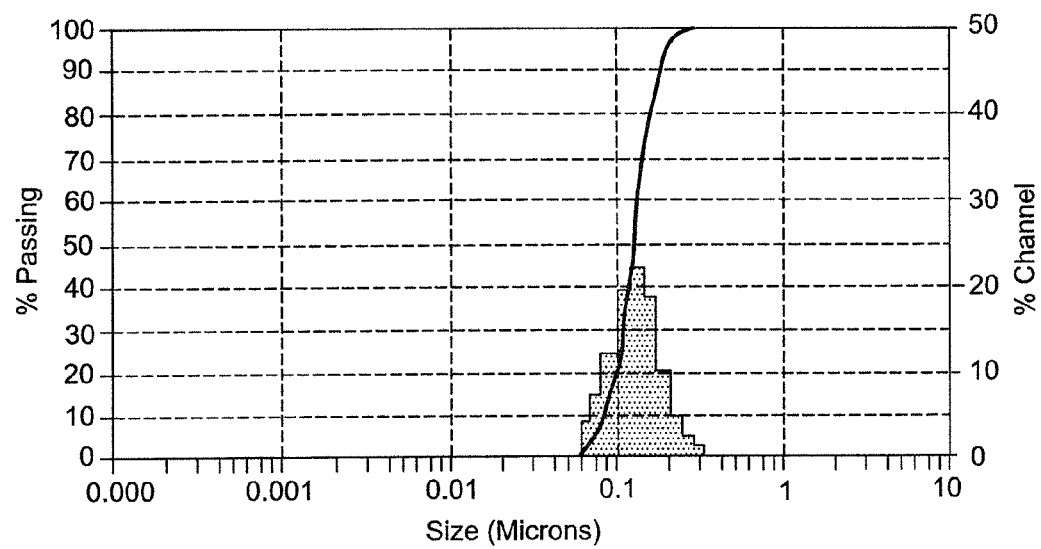

FIG. 12C includes the particle size distribution of the particles of FIG. 12A after hydrophobizing treatment as described in Example 7.

Figure 13A:
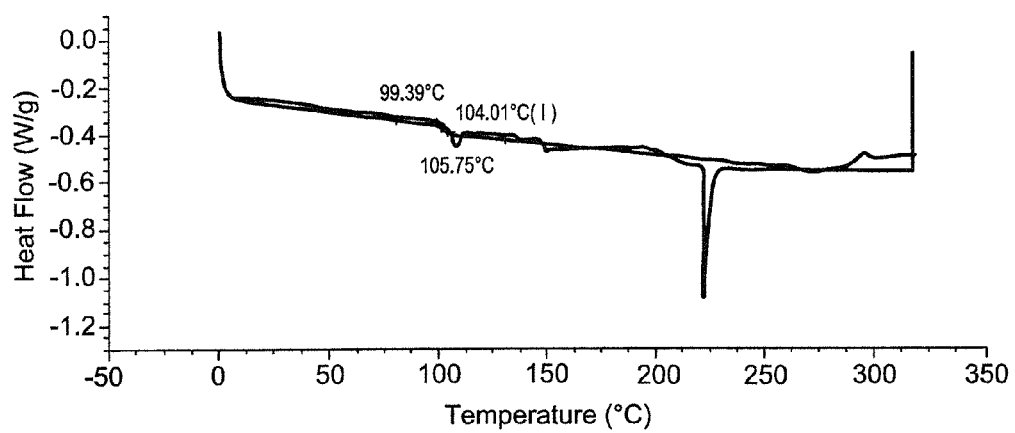
Figure 13B:
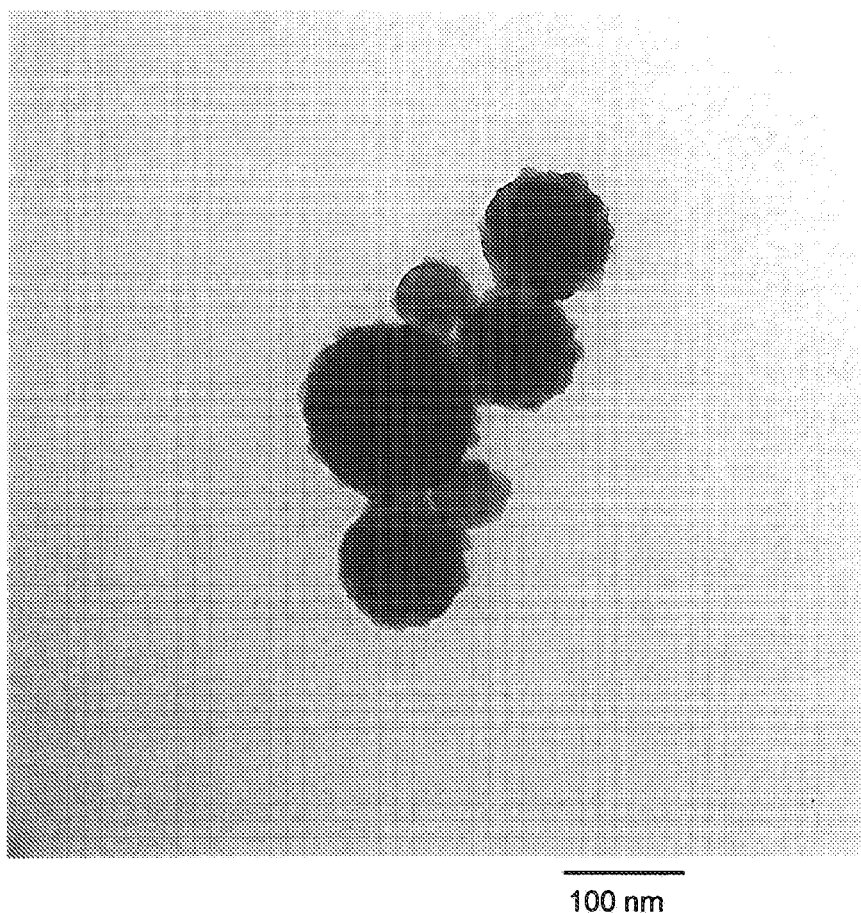

FIG. 13 includes the DSC profile (A) and transmission electron micrograph (B) of composite particles described in Example 8 according to an embodiment of the invention.

DETAILED DESCRIPTION OF THE INVENTION

In an embodiment, the invention provides composite particles comprising core particles having organosilica particles disposed about the core particles. The organosilica particles may be retained on the organic core material via non-covalent interactions, via covalent bonds, or via an alternative mechanism.

As used herein, "organosilica" is a solid material comprising silicon present as T units with any designation higher than T0 and having an attached R group that is an organic group, for example, $C_1$-$C_4$ alkyl, $C_2$-$C_4$ alkenyl, or $C_2$-$C_4$ alkynyl. The organosilica particles have a molar ratio of C to Si of 0.5 or greater, for example, from 1 to 4 or from 2 to 4, and/or a molar ratio of O to Si of 1.75 or less, for example 1.5 or less, for example from 1.25 to 1.75. For example, organosilica may be prepared by at least partial hydrolysis and condensation of one or more organosilane compounds, optionally accompanied by up to 50 molar percent of a tetraalkoxyorthosilicate, to form siloxane bonds.

T units in organosilica may be described by reference to NMR analysis, but their presence in the organosilica particles may be inferred from the use of the particular organosilane compounds discussed herein. The $^{29}$Si NMR spectra of silicon oxide-containing materials exhibit signal patterns in several well separated regions. The signal patterns in the NMR spectra of organosilica are due to the presence of various siloxane functional groups, commonly referred as M, D, T and Q structural units. The M, D, T, and Q notations refer to the number of oxygen atoms bonded to the silicon as monooxo (e.g., silicon bound to one oxygen), dioxo (i.e., silicon bound to two oxygens), trioxo (i.e., silicon bound to three oxygens), and quaternary (i.e., silicon bound to four oxygens), respectively, where the remaining (non-oxygen) bonds of the silicon are to carbon atoms, e.g, as part of an alkyl, alkenyl, alkynyl, aryl, or other substituted or unsubstituted organic group.

The $^{29}$Si NMR signals of the M, D, T and Q units appear in well-separated regions with chemical shifts between 2 and 20 ppm, between 0 and −25 ppm, between −40 and −70 ppm, and between −75 and −130 ppm, respectively, when the carbon atom (in the M, D, and T units) is part of a saturated aliphatic group, such as a methyl group. When the carbon for a T unit is part of an alkenyl group, the chemical shift appears about 10-15 ppm upheld of the shift for the corresponding alkyl substitution. Therefore, the $^{29}$Si NMR is a very powerful analytical technique for characterizing the nature of the silicon atoms in the organosilica particles. The nature of the silicon atoms in the organosilica particles can be determined from the distributions of $^{29}$Si NMR signals over well-resolved spectral regions.

Figure 1:
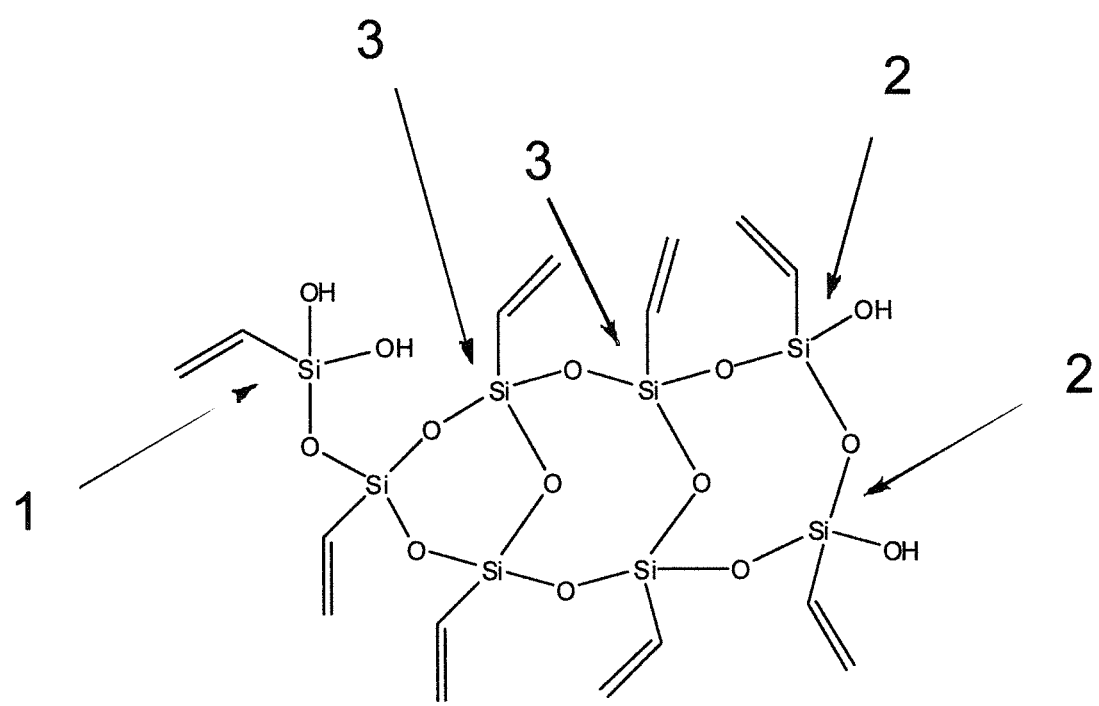
FIG. 1 is a schematic diagram of an organosilica network that can be formed by hydrolysis and condensation of vinyltrimethoxysilane.

The origin of the T units in the organosilica particles are also easily understood by reference to the process by which the organosilica particles are generated. As discussed herein, the organosilica particles result from the at least partial hydrolysis and reaction of an organosilane compound. For convenience, the explanation below employs vinyltrimethoxysilane (VTMS) as a specific organosilane compound, but the analysis is easily adapted to any of the other organosilane compounds discussed herein. The VTMS particles hydrolyze and react to produce networks of vinyl-silicon groups bound to each other via siloxane bonds. FIG. 1 is an example of a network that could be formed by this reaction. The silicon atoms are all T units because they have three oxygens and a carbon attached. The silicon atoms indicated by 3 are T3 units because the three oxygens are connected to additional silicon atoms. The silicon atoms indicated by 2 are T2 units because two of the oxygens are connected to additional silicon atoms. The silicon atom indicated by 1 is a T1 unit because only one of the oxygens is connected to an additional silicon atom. By extension, the silicon in VTMS is a T0 unit because the oxygen atoms in VTMS are connected to a silicon atom and to methyl groups—none of them are connected to additional silicon atoms. In contrast, the silicon atoms in inorganic silica (i.e., $SiO_2$) are all Q units because each silicon atom is connected to four oxygen atoms. For example, production of silica particles from hydrolysis and reaction of a neat tetraalkoxyorthosilicate, e.g., tetramethoxyorthosilicate, results in a network of silicon oxide in which the silicons are all present as Q units.

As discussed herein, NMR spectra were acquired using a Bruker Avance II NMR spectrometer with $^1$H resonance frequency at 400.13 MHz, and $^{29}$Si resonance frequency at 79.49 MHz, respectively. A 4-mm double resonance magic angle spinning (MAS) solid-state NMR probe was used. Typically, a magic angle spinning rate of 8000 Hz and a CP contact time of 10 ms were used. For enhancing the sensitivity of the NMR measurements, 20 full echoes of the NMR signals synchronized with MAS were generated using a train of refocusing RF pulses, called Carr-Purcell-Meiboom-Gill (CPMG) sequence. The combination of CP/MAS and CPMG techniques, called here as CP/CPMG/MAS, gives a signal enhancement of over a factor of 6, which makes it possible to obtain good $^{29}$Si NMR signals in a relatively short time. Typically, the NMR measurements were performed with the duration between the refocusing pulses of 6.5 ms, a recycle delay of 3 s, and the number of scans between 1000 and 4000. The $^1$H and $^{29}$Si NMR chemical shifts in ppm were referenced to the tetramethylsilane standard.

The core particles of the composite particles comprise, consist essentially of, or consist of an organic material, preferably a polymeric material. Suitable organic polymeric materials include, but are not limited to, polyesters, polyurethanes, polyester-acrylic copolymers, polyester-acrylic blends, polyester-styrene copolymers, polyester-styrene blends, styrene-acrylics, and acrylic resins. In certain preferred embodiments, the organic polymeric material is a condensation polymer, e.g., polyesters and polyurethanes. Both crystalline and amorphous polymers, or polymers having crystalline and amorphous domains, may be used. Exemplary polyesters include those employed for use in toner and other applications, for example, those disclosed in US Patents and Patent Publications Nos. 2011/0065034, 2011/0086301, U.S. Pat. No. 7,951,519, and 2011/0053078 and in Fukuri, et al., *Journal of Imaging Science and Technology*, 55(1):010509-010509-8, 2011, the contents of which are incorporated herein by reference. Exemplary polyurethanes include those disclosed in PCT Publication WO2012/054664, the contents of which are incorporated herein by reference. The number average weight of the polymer can range from about 1000 to about 50,000, for example, from about 2000 to about 3000, from about 3000 to about 5000, from about 5000 to about 10000, from about 10000 to about 20000, from about 20000 to about 30000, from about 30000 to about 40000, or from about 40000 to about 50000.

In certain embodiments, the organic material further comprises a polymerized ethylenically unsaturated monomer comprising an ethylenically unsaturated group, for example, an ethylene group or an alkylene group. In certain embodiments, the ethylenically unsaturated monomer does not undergo polymerization at the ethylenically unsaturated group. Rather, a separate group on the monomer has polymerized. For example a silane containing monomer may polymerize by forming siloxane bonds with other monomers or by bonding with the core material via Si— or Si—O groups. In certain other embodiments, the ethylenically unsaturated monomer undergoes polymerization at the ethylenically unsaturated group with itself and/or with the organic polymeric material, so as to crosslink the organic polymeric material. Non-limiting examples of ethylenically unsaturated monomers include styrene and methacryloxypropyltrimethoxysilane.

The organosilica particles are derived from reaction of an organosilane compound. Typically, following at least partial hydrolysis, the hydrolysis products undergo polymerization and/or condensation to form organosilica particles. The organosilica particles can be retained to the surface of the core particles via covalent or non-covalent interactions of the organic groups bound to silicon or via an alternative mechanism. In some embodiments, the organic groups bound to silicon can react with functional groups on the surface of the core particles to form covalent bonds that adhere the organosilica particles to the core particles. For example, when the organosilane compound has an ethylenically unsaturated organic group, the ethylenically unsaturated group can react with ethylenically unsaturated organic groups that may be present on the surface of the core particles. Alternatively or in addition, Si—O groups in the organosilica may react or interact with the surface of the core particle.

The organosilane compound may have the formula: $R^1SiR^2_3$, wherein $R^1$ is $C_1$-$C_4$ alkyl, $C_2$-$C_4$ alkenyl, or $C_2$-$C_4$ alkynyl and wherein $R^2$ is alkoxy, e.g., methoxy, ethoxy, or isopropoxy, chloro, bromo, or iodo. Non-limiting examples of suitable organosilane compounds include vinyltrimethoxysilane, allyltrimethoxysilane, trimethoxymethylsilane, and trimethoxypropylsilane.

The composite particles preferably have a roundness R of from 1.1 to 2.0, e.g., 1.15 to 2.0, wherein the roundness is determined by the formula: $R=P^2/(4\pi S)$ wherein P is the perimeter of a cross-section of the particle and wherein S is the cross-sectional area of the particle as measured on over 500 particles observed by transmission electron microscopy performed at 80 kV. Preferably, the composite particles have a roundness R of from 1.2 to 1.6 (e.g., from 1.2 to 1.5).

The roundness of the composite particles may be determined by TEM (transmission electron microscope) evaluation. Conventional image analysis software is used to define a perimeter P of a cross-section of the particle. The same software is used to calculate particle cross-sectional area S. These measurements are made for multiple particles, preferably at least 500 particles, on multiple TEM images. Particle Roundness is equal to $P^2/(4\pi S)$ (John C. Russ, The Image Processing Handbook, CRC Press, 4$^{th}$ edition, 2002). The roundness of an ideal spherical particle is 1.0.

In other embodiments, the invention provides a process for preparing the inventive composite particles. The process comprises the steps of (a) providing an aqueous dispersion comprising polymer particles and a surface agent, the pH of the dispersion being 8 or more, (b) adding an aqueous mixture comprising an at least partially hydrolyzed organosilane compound to the aqueous dispersion to form a mixture, wherein the organosilane compound has a formula: $R^1SiR^2_3$, wherein $R^1$ is $C_1$-$C_4$ alkyl, $C_2$-$C_4$ alkenyl, or $C_2$-$C_4$ alkynyl and wherein $R^2$ is alkoxy, e.g., methoxy, ethoxy, or isopropoxy, chloro, bromo, or iodo, and (c) forming the aqueous dispersion of composite particles via production of organosilica particles via reaction of the organosilane compound.

In certain embodiments, the composite particle is prepared from a polymer latex including a surface agent. In one embodiment, the polymer latex can be prepared by phase inversion. Briefly, a polymer is dissolved in a solvent. After the polymer is fully dissolved in solvent, a base (e.g., ammonium hydroxide, sodium hydroxide, potassium hydroxide, triethyl amine) is added to neutralize the acid group in the polymer. Water is then added to the polymer/solvent solution to form a dispersion, following which the solvent is distilled off to form a latex of the polymer in water. Parameters that affect the particle size of the latex include the acid number of the resin, the type and amount of base, and the solvent used to dissolve the polymer.

Formation of the polymer latex, or dispersion, can begin by preparation of a solution of the polymer in organic solvent. The polymer may be any polymer that is insoluble in water from pH about 6.5 to about 7.5 but is sufficiently acidic to form a stable latex in water without added dispersant. The polymer can be as described herein in connection with the composite particle. The polymer can have an acid number from about 5 to about 50 mg KOH/g, for example, from about 5 to about 10, from about 10 to about 20, from about 20 to about 30, from about 30 to about 40, or from about 40 to about 50 mg KOH/g.

The solvent is preferably one that will both solubilize the polymer and which exhibits at least some solubility in water. The solubility of organic solvent in water should be greater than 1 g in 100 mL of water. For example, methyl ethyl ketone has a solubility of 12 wt. % in water. Exemplary solvents include alcohols, ketones, esters, ethers, chlorinated solvents, nitrogen containing solvents and mixtures of two or more solvents, for example, acetone, isopropyl alcohol, ethanol, methanol, methyl acetate, methyl ethyl ketone, tetrahydrofuran, cyclohexanone, ethyl acetate, N,N dimethylformamide, dioctyl phthalate, toluene, xylene, benzene, dimethylsulfoxide, acetonitrile, and mixtures of any of these.

The polymer/solvent solution may include about 60 wt % of polymer in solvent, for example, from about 20 wt % to about 70 wt %, from about 40 wt % to about 65 wt %, or from about 50 wt % or about 55 wt % to about 62 wt %. The solvent may include a mixture of solvents, for example, 20 wt % isopropyl alcohol in methylethyl ketone or ethyl acetate. Gentle heating, e.g., well below the boiling point of the solvent, may facilitate dissolution of the polymer.

A base is then added to neutralize at least a portion of the acid groups on the polymer. A stoichiometric amount of base may be employed. A less than stoichiometric amount of base can also be used. A surface agent, described below, may be added to the solution at this point, following which water is slowly added with stirring to prepare a dispersion. Sufficient water should be added to emulsify the polymer/solvent solution; excess water will merely dilute the dispersion. In some implementations, the water may be added in a ratio of from about 4.5 parts by weight of water to 1 part solvent to about 5:1, for example, from about 4:1 to about 5.5:1, or from about 3.5:1 to about 6:1.

A surface agent may be added to the solvent/polymer phase before adding water to the polymer/solvent solution, or after the formation of the latex. When used, the surface agent is preferably added to the polymer/solvent solution. The surface agent may be used in an amount of about 1 wt % to about 30 wt % with respect to the polymer, for example, about 1% to about 10%, about 10% to about 20%, or about 20% to about 30%. The surface agent may be a silylated surface agent having the formula: $SiH_{3-x}R^3_xR^4Q$, where x is 1, 2, or 3, $R^3$ is alkoxy (e.g., methoxy, ethoxy, or isopropoxy), chloro, bromo, or iodo, $R^4$ is $C_3$-$C_{22}$ branched or unbranched alkylene or alkenylene, and Q is H, Cl, Br, F, hydroxyl, carboxylic acid, epoxy, amine, or a substituted or unsubstituted vinyl, acrylate, or methacrylate. Preferably, x is 2 or 3. $R^4$ may additionally include an ether, ester, or amine linkage or may be aromatic. In one implementation, the surface agent is methacryloxypropyltrimethoxysilane. When $R^1$ is chloro, bromo, or iodo, hydrolysis of the surface agent will produce the corresponding acid (e.g., HCl), which will change the pH of the reaction media. This may in turn require adjustment of the reagent amounts discussed elsewhere herein. Following hydrolysis, the surface agent should be insoluble or have very limited solubility in water; the unhydrolyzed surface agent should be soluble in the solvent used to dissolve the polymer. In an alternative embodiment, the surface agent is not silylated but is a polyethylene glycol-based polymer, quaternary amine-based organic compound, polyvinylpyrrolidone- or other polypyrrolidone-based surfactant, or an anionic surfactant with a sulfate anionic component.

Following formation of the dispersion, it may be heated to below the boiling point of water to distill off the solvent. The solvent may also be distilled at reduced pressure. In some implementations, removal of the solvent is optional. Alternatively or in addition, at least 10%, e.g., at least 20%, at least 30%, at least 40%, at least 50%, at least 60%, at least 70%, at least 80%, at least 90%, at least 95%, or at least 98% of the solvent is removed. Because the solvent is at least partially miscible with water, where it is desired to remove substantially all of the solvent, an excess of fluid with respect to the original amount of solvent should be removed. A phase diagram may assist the skilled artisan in selecting a desirable distillation temperature. If the surface agent has not already been added to the reaction mixture, it may be added to the latex resulting after distillation.

In some embodiments, a styrenic, acrylic, or other monomer that polymerizes through a free radical process may be incorporated into the latex at the same time or at a different time than the surface agent. The monomer may be added to the polymer solution or combined with the organic solvents to dissolve the polymer before the phase inversion process. Alternatively or in addition, the monomer may be diffused into the polymer micelles after the latex is formed or may be diffused into the polymer micelles of a commercial latex. Exemplary monomers include styrene, alkyl or vinyl substituted styrene, methyl methacrylate, fluorinated methacrylates, and other styreneic or (meth)acrylic monomers.

The latex particles may be crosslinked prior to formation of the organosilica particles, with or without the presence of the additional monomer. For example, a surface agent with a carbon-carbon double bond may be crosslinked, or double bonds in the polymer itself may be crosslinked. For crosslinking, a radical initiator may be diffused into the latex particles. Where a monomer is diffused into the latex, the initiator and monomer may be combined and diffused into the latex together. Exemplary initiators include thermally or UV activated radical and ionic initiators, e.g., azobisbutyronitrile (AIBN) and benzoyl peroxide. After addition of the initiator, the system may be polymerized for 4-8 hours at a temperature in excess of the activation temperature. The crosslinking density may be adjusted by varying the amount of additional monomer that is introduced into the system.

In an alternative embodiment, the polymer particles may be provided as an emulsion. For example, emulsion polymerization of chain-growth polymers results in an aqueous emulsion containing polymer particles. Such methods are commonly used to prepare polymers that grow by radical polymerization, for example, polyolefins, acrylic polymers such as polymethyl methacrylate and fluorinated methacrylates, styrenic polymers such as polystyrene or polymerized alkyl or vinyl substituted styrene, and copolymers of any of these such as styrene-acrylates or cross-linked polystyrenes. Commercial emulsions are widely available and should be stable under the reaction conditions, e.g., pH, used to produce the composite particles. Examples of polymer emulsions include the Joncryl™ styrene-acrylic resins available from BASF and Rhoplex™ acrylic resins available from Dow Chemical Corporation. In this embodiment, the surface agent would be added to the latex prior to addition of the organosilane precursor. The addition of a surface agent may be optional with commercial polymer emulsions, which are typically stabilized with surface agents such as surfactants. In addition, depending on the composition of the polymer, it may not be necessary to neutralize acid groups on the polymer.

Any suitable inorganic particulate material may also be added to the polymer dispersion before formation of the organosilica particles, provided that the particulate material is compatible with the polymer dispersion. Non-limiting examples of suitable inorganic particulate materials include metal or metal oxide particles. Such a material may be added at about 10-20 wt % with respect to the polymer and may be added to the mixture at any suitable time. The particles may have a number average particle size from 10 nm to about 30 nm. Of course, it is easier to make small composite particles with smaller metal or metal oxide powders.

Exemplary metal powders may include any desirable metal and may take any shape, including rods, flakes, or prolate shapes. Metal oxide particles appropriate for use with the present invention include silica, alumina, germania, ceria, molybdenum oxide, titania, zirconia, zinc oxide, iron oxides, including but not limited to magnetite ($Fe_3O_4$) and various forms of $Fe_2O_3$, niobium oxide, vanadium oxide, tungsten oxide, tin oxide, or mixtures or mixed oxides of any two or more of these.

The metal or metal oxide particles should be compatible with the polymer. Metal oxide particles may need to be treated with a hydrophobizing agent to render them compatible. Typically, the hydrophobizing agent is bonded either covalently or non-covalently to the metal or metal oxide particles. In certain embodiments, the hydrophobizing agent can be a silicone fluid. The silicone fluid can be a non-functionalized silicone fluid or a functionalized silicone fluid. Non-limiting examples of useful non-functionalized silicone fluids include polydimethylsiloxanes, polydiethylsiloxanes, phenylmethylsiloxane copolymers, fluoroalkylsiloxane copolymers, diphenylsiloxane-dimethylsiloxane copolymers, phenylmethylsiloxane-dimethylsiloxane copolymers, phenylmethylsiloxane-diphenylsiloxane copolymers, methylhydrosiloxane-dimethylsiloxane copolymers, polyalkylene oxide modified silicones, cyclic polysiloxanes of the D3, D4, and D5 types, and the like. Alternatively or in addition, any of the hydrophobizing agents commonly used for modification of metal oxide particles, e.g., those listed in WO2013/063291, may be employed.

To form the organosilica particles, the polymer dispersion is diluted to about 5 wt % solids (e.g. surface agent+polymer), for example, from about 0.1 wt % to about 20 wt %, for example from about 0.1 wt % to about 1 wt %, from about 1 wt % to about 5 wt %, from about 5 wt % to about 10 wt %, from about 10 wt % to about 15 wt %, or from about 15 wt % to about 20 wt %. The pH of the dispersion is adjusted to at least 8, for example, from 8 to 8.5, from 8.5 to 9, from 9 to 9.5, from 9.5 to 10, 10 to 10.5, from 10.5 to 11, from 11 to 11.5, from 11.5 to 12, or from 12 to 12.5, for example, by addition of ammonium hydroxide, e.g., 25-30 wt %, e.g, 28 wt %, in water. An at least partially hydrolyzed organosilane compound is added to the latex to form a mixture. The organosilane compound used as precursor to prepare organosilica may have the formula $R^1SiR^2{}_3$, as described herein in connection with the composite particle. The at least partially hydrolyzed organosilane compound may be obtained by dissolving the unhydrolyzed organosilane compound in water. The resulting solution, in which the organosilane compound has at least partially hydrolyzed, is added to the latex. The weight ratio of the organosilane compound (i.e., weight basis of unhydrolysed organosilane compound) with respect to the polymer may be from 0.1 to 2, for example, from 0.1 to 0.5, from 0.5 to 1, from 1 to 1.5, or from 1.5 to 2, depending on the desired organosilica/polymer ratio. After the organosilane compound is allowed to react, additional reagent, for example, the same amount of organosilane compound as was added before, may be dissolved in water and added to the latex. It may take several hours, e.g., 1-4 hours, for the reaction to proceed to a desired extent. The reaction may be allowed to proceed at room temperature.

The aqueous dispersion of composite particles can be purified using any suitable technique. In an embodiment, the aqueous dispersion of composite particles can be purified by diafiltration. Alternatively or in addition, commercial polymer latices may be purified prior to preparation of the composite particles.

In this embodiment, the composite particles may be treated with a hydrophobizing agent as described herein in connection with the composite particle.

The composite particles may be used in dispersion or may be dried and used as a powder. Drying may be performed by any method known to those of skill in the art, e.g., spray drying or tray drying. The composite particles may be dried prior to hydrophobizing treatment or may be hydrophobized in dispersion.

Alternatively or in addition, an aqueous dispersion of the composite particles may be solvent exchanged to prepare a dispersion of the composite particles in another solvent, e.g., an organic solvent. Exemplary solvent exchange methods include diafiltration/ultrafiltration and addition of the solvent during evaporation of the aqueous solvent.

The average core diameter, for example, can be within the range of from 40 nm to 800 nm, e.g., within the range of from 40 to 75 nm, from 75 to 100, from 100 to 150, from 150 to 200, from 200 to 250, from 250 to 300, from 300 to 350, from 350 to 400, from 400 to 450 or from 450 to 500 nm.

In CMP applications, the composite particles described herein can deliver the abrasion characteristics of the colloidal particles they contain, yet they can be packaged into a larger particle. This reduces the potential for contamination of the substrate surface with adventitious small particles that might otherwise get trapped in surface structures. Van der Waals forces dominate adhesion to surfaces at length scales less than 50 or 100 nm, and colloidal silica particles of that size or smaller can be difficult to clean off. Use of composite particles which are larger than 50 or 100 nm in diameter ensures that the particles "behave" hydrodynamically and physically as larger particles that are easier to remove with flows of water and cleaning approaches, even where the composite particles contain inorganic particles less than 50 or 100 nm in size. In addition to the reduced contact points and larger size, the bulk density of the particles is reduced, facilitating their ability to be dislodged via convective fluid flows.

Figure 2:
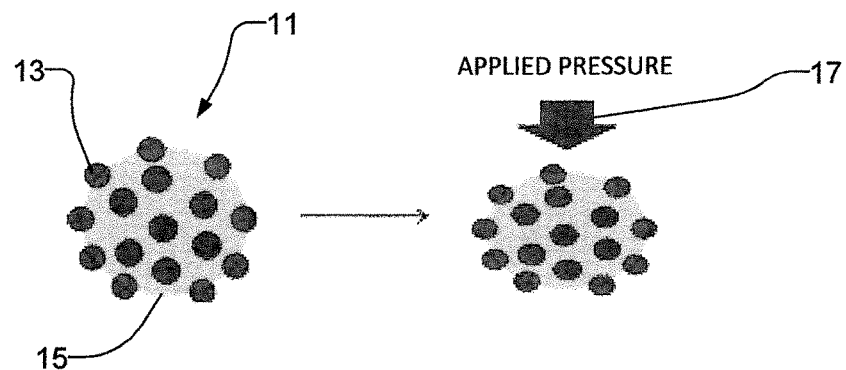
FIG. 2 is an illustration depicting the deformation of a polymer-metal oxide particle under applied pressure.

The polymer core can help define and control the pad/wafer interaction gap. This in turn can affect the removal rate along with the abrasivity of the inorganic components by ensuring they contact the wafer surface with much less down force than may be otherwise exerted by the pad. Since increased down force increases removal, defectivity, and nonuniformity, the reduction in down force can lead to less overall defectivity. Dampening of the down force applied by the polishing pad is illustrated in FIG. 2. As shown in this schematic diagram, composite particle 11 includes organosilica particles 13 disposed about polymeric core 15. The polymeric core is capable of deformation (see the somewhat flattened shape of composite particle 11) in response to an applied pressure (represented by arrow 17), thus dampening the down force being applied. Additionally, this size control may further aid the within wafer and within die uniformity over larger distances, especially as pad and wafer sizes increase to accommodate 300 mm and 400 mm wafer CMP technologies.

Figure 3:
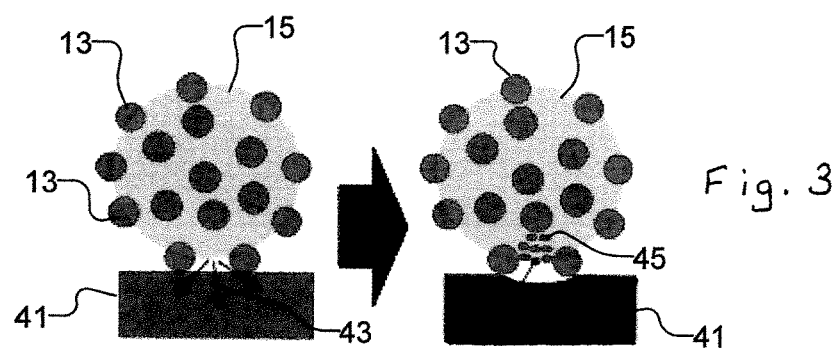
FIG. 3 illustrates effects of an etching ingredient incorporated in a metal oxide-polymer composite particle.

An important parameter in CMP operations is the fluid flow of and mechanism of etched material removal. The surface chemistry and structure of the composite particles can be tailored to enhance the removal of the etched material away from the substrate surface and could also be trapped on the core particle surface when the surface chemistry of the core particles is tailored to attract the debris or chemicals evolved from the abraded surface. Surface modification materials that could be utilized include compounds that have redox properties (such as, for instance, cerium-containing compounds) or acidic or basic surface groups. Shown in FIG. 3 is composite particle 11, including organosilica particles 13, disposed about polymeric core 15. In the normal course of CMP processing of workpiece 41, the concentrated flow of etched material is illustrated by arrows 43. With a surface modification such as described above, however, etched material 45 can be trapped to the surface of or become embedded into core 15 of the composite particle. Designing composite particles that can retain at least some abraded material would reduce the amount of debris present at the pad-wafer interface. Residual particles or debris left on wafer (not removed during post CMP cleaning) are a source of defectivity. Additionally, removed material debris can get caught in the pad, altering the pad properties, or potentially damaging the wafer during the continuing CMP process. Collecting and lowering the free abraded material stuck on wafer or pad surfaces may decrease scratching and polishing pad clogging and reduce the need for pad conditioning or dressing. This may be achieved via the deposition of specific regions on the composite particles which have surface chelating groups, opposite charge to the substrate surface materials at a given pH, or some other intrinsic chemical or physical attraction to the surface materials. Due to the presence of the protruding abrasive species on the composite particles, the only way for these patches of strong surface material attraction to function is remove debris once it is freed from the substrate by the action of CMP.

In some embodiments the composite particles include "additional" materials that may contribute to improving the CMP process. In specific examples, the additional ingredient is one that may be used in a CMP slurry (further discussed below). This approach can serve to partially or entirely replace use of the ingredient in the slurry, potentially simplifying slurry composition and/or reducing the amounts of the ingredient otherwise required. The approach can also provide additional amounts of an ingredient or a different ingredient to the CMP operation. Furthermore, the presence of the ingredient can be localized to a well defined region, in particular the work region where the composite particles come in contact with the surface of the workpiece.

In one example, the composite particles provide chemical etchants, e.g., metal oxidizers, such as hydrogen peroxide, metal binding, complexing, or chelating groups, such as, for example, quinolinic acid. Chemical etchants can be present in the composite particles in an amount within the range of from about 0.1 wt % to about 10 wt %, e.g., from about 0.5 wt % to about 5 wt % based on total mass of the composite particles.

Chemical removal accelerators can be added to enhance the chemical aspects of polishing to achieve higher rates or greater selectivity. Suitable examples include: phosphate compounds (e.g., ammonium hydrogen phosphate, ammonium dihydrogen phosphate, potassium dihydrogen phosphate, bis(2-ethylhexyl)phosphate, 2-aminoethyl dihydrogen phosphate, 4-chlorobenzene diazonium hexafluorophosphate, nitrobenzene diazonium hexafluorophosphate, ammonium hexafluorophosphate, bis(2,4dichlorophenyl)chlorophosphate, bis(2-ethylhexyl)hydrogenphosphate, calcium fluorophosphates, diethyl chlorophosphate, diethyl chlorothiophosphate, potassium hexafluorophosphate, pyrophosphate, tetrabutylammonium hexafluorophosphate tetraethylammonium hexafluorophosphate, and any combination thereof), phosphite compounds (e.g., bis (2-ethylhexyl)phosphate,) or other suitable materials. These and/or other rate accelerators can be present in the particles in an amount within the range of from about 0.1 wt % to about 10 wt %, e.g., from about 0.5 wt % to about 5 wt % based on total mass of the composite particle.

Selectivity can be increased by passivating agents that can be incorporated in the metal oxide-polymer composite particles. The role of these agents is that of protecting one surface over another, e.g., exhibiting markedly lower nitride CMP removal rate versus oxide removal rate. Some nonlimiting examples of passivating agents that can be incorporated in the composite particles are: various anionic, nonionic, and cationic surfactants and polymers. Suitable anionic polymeric passivation agent include one or more of poly(acrylic acid), poly(methacrylic acid), poly(acrylic acid-maleic acid), poly(methacrylic acid-maleic acid), poly (acrylic acid-acrylamide), poly(acrylonitrile-butadien-acrylic acid), poly(acrylonitrile-butadien-methacrylic acid), a derivative or salt of any of the foregoing, and any combination thereof. Passivating agents can be present in the particles in an amount within the range of from about 0.1 wt % to about 10 wt %, e.g., from about 0.5 wt % to about 5 wt % based on total mass of the composite particle. Polymers like those described above could be present during the initial synthesis of the composite particles, or they could be added to the composite particle post synthesis by physical or chemical adsorption to the surface of the inorganic or polymer phase of the composite particles. Derivative chemistries such as alkoxysilane functionalization or other chemistry could enable direct covalent coupling to the surface silanols as another alternative of attaching passivating agents to the composite particle surface.

Additional materials such as those described herein can be incorporated into the composite particles at any suitable point during the preparation of the particles. For instance, a chemical etchant, an accelerator or a passivating agent can be added during or after the formation of the composite particles.

As discussed above, the organosilica component of the composite particles may be treated during or after the preparation of the composite particles described herein. Organic modifiers, inorganic modifiers, or both can be used to alter the chemistry and/or functionality of the organosilica component of the composite. For example, the metal oxide particles can be treated to enhance CMP material removal properties, to change the reactivity of the metal oxide particles towards specific species in the workpiece, to shift the hydrophilic/hydrophobic character of the surface, or for other reasons.

Adjustments also can be made with respect to the core. For example, the surface or bulk chemistry of the core can be designed to provide properties that might prevent or minimize re-deposition of abraded materials, debris, undesired byproducts and so forth back onto the surface being planarized. Examples of additional materials that can be used include metal chelating agents (for planarizing metal surfaces), materials that could bind to the surface of the removed or abraded substrate oxide bits, e.g. alkoxy silane materials, phosphates, and so forth, (in the case of CMP of metal oxide surfaces). These additional materials can be present at the core surface and/or throughout the core. The selection of these moieties can be tailored to be most active at working temperatures, which are often hotter than room temperature (e.g. 25° C.) and can be as high or higher than 60° C. from the friction resulting from the CMP action. The actual temperatures depend on the substrate surface (metal or oxide for example), the CMP polishing duration, down force and other process variables.

Additional materials can be added during or after the formation of the composite particles.

The composite particles disclosed herein can be used in alternate CMP processes. For example, they can be incorporated in CMP slurries, CMP polishing pads or in other CMP-related compositions or tools. These composite particles also are suitable for the chemical mechanical polishing (also abbreviated as CMP) of optical components, dental materials, glass, semiconductors, ceramic surfaces (including but not limited to light emitting diodes, photovoltaics, semiconductors, and optical fibers) as well as stock silicon wafers, ceramic and refractory materials, and others. In these alternate CMP processes, these slurries are implemented in similar fashion such that the abrasive components of the composite particles are brought into abrasive contact with the desired substrate to polish or remove substrate material.

A specific aspect of the disclosure relates to CMP slurries that include composite particles such as those described above. As used herein, the term "slurry" refers to a dispersion of solid particles in a liquid medium. For most, if not all CMP applications, the slurry is aqueous. If desired, non-aqueous slurries, or aqueous/solvent combinations can be formulated following known general principles and the teachings provided here. In specific implementations, an exemplary aqueous dispersion for CMP of a metal film includes metal oxide-polymer composite particles in an amount of 1-10% wt, 5-15%, 10-20% wt, or 15-30% wt based on the total weight of the slurry.

Typically, the composite particles are "dispersed" in the slurry, meaning that these particles are distributed throughout the liquid (e.g., aqueous) medium. Preferably they are evenly distributed. As used herein, the term "colloidally stable" describes a dispersion of particulate material (e.g., the composite particles described above) in a liquid medium and which remains dispersed by Brownian Motion absent interaction with other particulate species. That is, as a standalone ingredient for integration into a slurry with other particulate species, a colloidally stable dispersion is generally substantially free of agglomeration and the particulates may be substantially mono-dispersed, and stable with minimal variation at ambient conditions for a suitable time, e.g. many months, without disturbance. In some embodiments the state of dispersion of the particulate materials employed in the slurry may be altered.

Shelf life can be an important consideration for ready-made slurries and many dispersions described herein can remain stable (without phase separation, aggregation, or settling) for days, weeks, months, years or indefinitely. Shelf life requirements can be relaxed for slurries that are prepared at the time and point of use. In such cases, the dispersion only needs to be stable for minutes or hours. Generally, stable slurries are advantageous in terms of process repeatability, process stability, lower surface defectivity, better performance consistency and other considerations important in CMP.

In some cases preparing a stable CMP dispersion is not straightforward and difficulties may be encountered, for example, when attempting to form a stable aqueous dispersion of metal oxide-polymer composite particles.

Several approaches can be employed to address this problem. In some implementations, dispersion stabilization is obtained through mechanical approaches, e.g., by using, for instance, a high energy mechanical dispersion machine such as described in U.S. Pat. No. 8,062,547, issued to Paik et al. on Nov. 22, 2011.

In other implementations, the composite particles are treated with a hydrophilic additive such as, for example, alkyl ethoxylate, linear alkylbenzene sulfonate (LAS), alkyldimethyl amine oxide, and alkyl carboxy betaine. The hydrophilic additive may be added in an amount of 0.0001-10 wt %, and comprises, in many cases, a polymer having a molecular weight of 2,000-50,000 g/mol.

In further implementations, dispersion stabilization of an aqueous CMP slurry containing composite particles is enhanced by including a dispersing agent, such as, for instance, a polymeric dispersing agent, e.g., polyethlyene glycol, polyampholyte, potassium nonanoic acid and the like. The dispersing agent can be added in an amount of 0.0001-10 wt % and can comprise a polymer having a molecular weight of 2,000-50,000 g/mol. As discussed in U.S. Pat. No. 8,062,547, issued to Paik et al. on Nov. 22, 2011, dispersing agents with molecular weights that are more than 50,000 g/mol can cause re-agglomeration between particles due to a phenomenon such as bridging, thus promoting the formation of large particles. Alternatively, steric stabilization can be imparted by other nonionic surfactants such as the sorbitol series known as Tween® 20, 40, 60, 80 and etc. or polyethylene oxide (PEO)/polypropylene oxide (PPO) copolymers of varying block length could be considered. The number in the Tween series or the PEO-PPO copolymer block length refers to the hydrophilic/lyophilic balance in properties presented by the chemical structure, which can have a strong influence on particle stability, by a similar means as that described.

In a further example, the slurry may include a weak acid, organic acid, or weak base for pH adjustment and slurry stabilization. In this case, slurry stabilization by pH manipulation refers to attaining the pH at which the particles gain sufficient surface charge (as measured by zeta potential) to become electrostatically stable. For example, a typical composite particle of MPS formed polymer and 20-50 nm silica particles, of average composite particle diameter 300 nm, with approximately 40-50% of the silica particle surface exposed to the aqueous dispersion liquid (the remainder being embedded in the hydrophobic polymer core) and nothing else in the dispersion can be well stabilized by the addition of ammonia or potassium hydroxide at pH 10. Such a simple dispersion or slurry can be easily used for oxide ILD type CMP applications. Note that for more complex formulations of slurry, this acid or base must also achieve stabilization of various other slurry components.

Typically, when immersed in a solution, colloidal particles such as the composite particles described herein will have a surface charge caused by adsorption/desorption effects. The surface charge can be modified through pH adjustments (silica, for example, has an isoelectric point (IEP) at a pH of about 2 to 3), use of charged additives (e.g., salts), use of surfactants, and through other techniques known in the art.

There are no particular constraints with respect to the pH of slurries described herein. Slurry pH can be adjusted according to the requirements of a particular application. In one example, a pH adjustor such as potassium hydroxide or ammonia is incorporated in the dispersion to adjust its alkalinity. Typically, in interlayer dielectric oxide polishing processes, the pH is about 11 in order to maximize the solubility of the substrate and facilitate removal rates without dissolving the abrasive silica particles in the slurry.

The CMP slurry described herein, containing metal oxide-polymer composite particles in a liquid medium, can include additional components or ingredients, Example include but are not limited to rheology agents, oxidizing agents, chelating agents, complexing agents, corrosion inhibitors, surfactants, particulate materials other than the polymer-metal oxide particles described herein, combinations thereof and/or other components. In turn, any of these ingredients, as well as the composite particles described herein can be provided in a liquid vehicle, such as, for instance, water; alcohols, such as isopropyl alcohol, methanol, ethanol, propanol, butanol; ethylene glycol; propylene glycol; glycerin; ketones, such as acetone; ethers, such as diethylether, tetrahydrofuran (THF); water-alcohol solutions; other solvents; or combinations of solvents.

Rheology agents can be included in the CMP slurry to control its viscosity and to structure the laminar flow of the slurry, for instance to reduce vertical fluid motion. Any conventional rheology agents can be used in the present slurry compositions, including, but not limited to, cross-linked acrylic polymers and water soluble polymers (WSPs). Some examples include modified cellulose derivatives, cellulose ethers, starch derivatives, pectin derivatives, polyacrylamides, hydroxypropylcellulose, hydroxyethylcellulose, and carboxymethylcellulose. Mixtures of two or more rheology agents also can be utilized.

Chelating agents can further be included in the slurry composition. Such agents can be used, for example, in abrasive slurries wherein they chemically react with metal ions removed from the polished/planarized surface to form a soluble metal complex to minimize re-deposition of metal ions on the surface of the substrate. Any conventional chelating agents can be used and include, for example, one or more amine or amide groups (e.g. ethylenediaminetetraacetic acid, ethylenediamine, and methylformamide) and organic acids (e.g. iminodiacetic acid and oxalic acid).

The slurry can also include one or more corrosion inhibitors. When provided in a CMP slurry these compounds can react with the fresh polished/planarized surface and/or oxidized surface to passivate the surface and prevent excessive etching of the surface during CMP operations. Illustrative examples of corrosion inhibitors that can be used, include, but not limited to, alkyl amines, imidazole, aminotetrazole, benzotriazole, mercaptobenzothiazole, 5-methyl-1-benzotriazole, benzimidazole, amino, imino, carboxy, mercapto, nitro, alkyl, urea and thiourea compounds and derivatives, etc., dicarboxylic acids such as oxalic acid, malonic acid, succinic acid, nitrilotriacetic acid, iminodiacetic acid, and combinations thereof.

In many cases, the slurry includes one or more surface active agents (surfactants). Suitable surfactants include nonionic, anionic, cationic, nonionic, zwitterionic, amphoteric, and polyelectrolyte compounds. Surfactants that can be utilized are disclosed in, for example, Kirk-Othmer, Encyclopedia of Chemical Terminology, 3rd Edition, Vol. 22 (John Wiley & Sons, 1983), Sislet & Wood, Encyclopedia of Surface Active Agents (Chemical Publishing Co., Inc. 1964), Ash, The Condensed Encyclopedia of Surfactants (Chemical Publishing Co., Inc., 1989), Tadros, Surfactants (Academic Press, 1984), all of which are incorporated herein by reference. Specific examples include salts of organic acids, alkane sulfates, alkane sulfonates, hydroxides, substituted amine salts, betaines, polyethylene oxide, polyvinyl alcohol, polyvinyl acetate, polyacrylic acid, polyvinyl pyrrolidone, polyethyleneimine, esters of anhydrosorbitols, quaternary such as tetramethyl ammonium halides, cetyl trimethyl ammonium halides, nonyl ethers and combinations thereof. An aqueous dispersion for CMP of a metal film may include a surfactant such as anionic surfactant, cationic surfactant and/or nonionic surfactant. As the anionic surfactant, it is possible to employ aliphatic soap, sulfate ester, and phosphate ester, etc. As the cationic surfactant, it is possible to employ aliphatic amine salt, aliphatic ammonium salt, etc. Further, as the nonionic surfactant, it is possible to employ acetylene glycol, ethylene oxide adduct thereof, and acetylene alcohol, etc. Furthermore, it is also possible to employ silicone-based surfactants, polyvinyl alcohol, cyclodextrin, polyvinyl methylether, hydroxyethyl cellulose, etc. These surfactants may be employed singly or as a mixture comprising two or more kinds. If present, the surfactant may be provided in an amount of from about 0.001 to about 0.5 wt %, for example, from about 0.05 to about 0.3 wt % based on a total weight of an aqueous dispersion The slurry may contain particles other than the composite particles described herein. In many examples, these "additional" particles also are dispersed in the liquid medium. Examples include other types of particles suitable in conducting CMP operations, such as, for example, silica, alumina, silicon carbide, and so forth.

The slurry can also include one or more oxidizing agents. These agents generally include any substance which removes metal electrons and raise the atomic valence. Oxidizing agents include, but are not limited to, hydrogen peroxide, urea hydrogen peroxide, monopersulfates, dipersulfates, peracetic acid, percarbonates, organic peroxides such as benzoyl peroxide, di-t-butyl peroxide, periodic acid, periodiate salts, perbromic acid, perbromate salts, perchloric acid, perchloric salts, perboric acid, perborate salts, permanganates, permanganate salts, hydroxylamine, ferric nitrate, and nitric acid. For instance, the oxidizing agent can be ammonium persulfate, potassium persulfate, ferric nitrate, diammonium cerium nitrate, iron sulfate, ozone and potassium periodate. The content of the oxidizing agent may be from 0.05 to 5 wt % based on the aqueous dispersion, for example, from 0.08 to 3 wt % based on the aqueous dispersion.

In some implementations, the CMP slurry includes an oxidizing agent for metal and/or a metal complexing agent for forming an organometal complex. In specific implementations, the content of the complexing component is from 0.001 to 3.0 wt % based on the aqueous dispersion, for example, from 0.05 to 2.0 wt % based on the aqueous dispersion.

Combinations of oxidizing agents and/or complexing agents also can be employed. For instance, the complexing agent may combine a first complexing agent for forming a water-insoluble complex and a second complexing agent for forming a water-soluble complex. In the present context, the terms "water-insoluble" is intended to mean that the complex cannot be substantially dissolved in water, so that as long as the wet etching rate is less than 3 nm/min in the presence of an oxidizing agent, such a hardly soluble complex will be included in this definition. On the other hand, the terms "water-soluble" is intended to mean that the wet etching rate is 3 nm/min or more.

As the first complexing agent which forms, together with a metal, a complex which is insoluble or hardly soluble in water, it is possible to employ, for example, heterocyclic compounds such as 6-membered heterocyclic compound containing at least one N atom and 5-membered heterocyclic compound containing at least one N atom. More specifically, it is possible to employ quinaldinic acid, quinolinic acid, benzotriazole, benzoimidazole, 7-hydroxy-5-methyl-1,3,4-triazaindolidine, nicotinic acid, picolinic acid, etc. In some implementations, the first complexing agent is an anionic surfactant used to form a water-insoluble complex. Examples include but are not limited to alkylbenzene sulfonate, examples of which include, for example, potassium dodecylbenzene sulfonate, ammonium dodecylbenzene sulfonate, etc. If employed, the content of the first complexing agent may be from 0.0005 to 2.0 wt % based on a total weight of the aqueous dispersion for CMP, for example, from 0.0075 to 1.5 wt %, e.g., 0.0075 to 0.01, 0.01 to 0.05, 0.05 to 0.1, from 0.1 to 0.5%, from 0.5 to 1.0, from 1.0 to 1.5% based on a total weight of the aqueous dispersion for CMP.

The second complexing agent forms a water-soluble complex and can serve as a polish-accelerating agent. Examples of the second complexing agent include but are not limited to amino acids such as glycine, alanine, tryptophan, etc. Organic acids exhibiting almost the same effects as those of the above-mentioned materials can be effectively employed. Examples of such organic acids include, for example, formic acid, lactic acid, acetic acid, tartaric acid, fumaric acid, glycolic acid, phthalic acid, maleic acid, oxalic acid, citric acid, malic acid, malonic acid, glutamic acid, etc. Furthermore, it is also possible to employ ammonia, ethylene diamine, and basic salts such as tetramethyl ammonium hydroxide (TMAH). The second complexing agent may be provided in an amount of from 0.0005 to 2.0 wt %, for example, from 0.0075 to 1.5 wt %, e.g., 0.0075 to 0.01, from 0.01 to 0.05, from 0.05 to 0.1, from 0.1 to 0.5, from 0.5 to 1.0, from 1.0 to 1.5% based on a total weight of the aqueous dispersion for CMP. The amount used may depend, at least in part on the composition of the metal.

Each of these first and second complexing agents may be employed singly or in a combination of two or more kinds.

Figure 4:
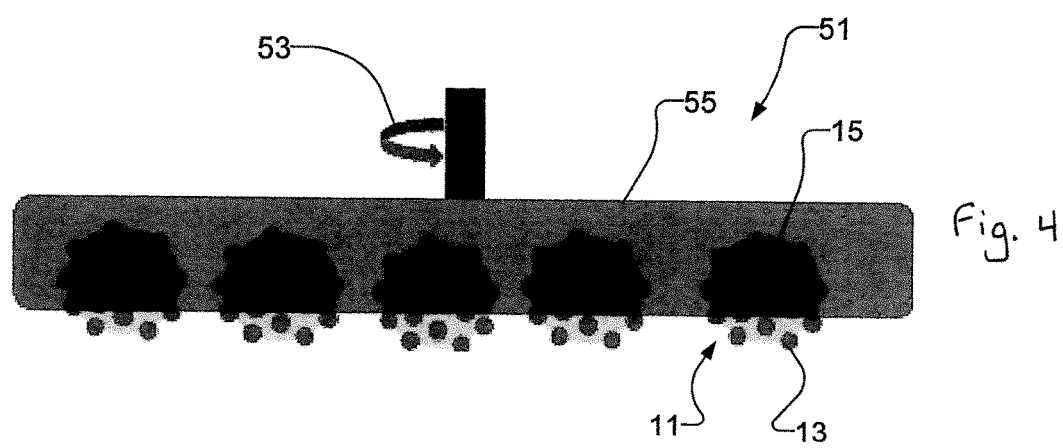
FIG. 4 is a schematic diagram of a CMP polishing pad according to embodiments of the invention.

Another aspect of the disclosure relates to a tool, and in particular a polishing pad, used in CMP or other polishing processes, that includes the composite particles described herein. Incorporating the composite particles in the CMP polishing pad can reduce the mass of free particles in the liquid slurry and therefore reduce the potential for contamination of the substrate surface. Furthermore, the "hard-soft" nature of these particles can help reduce scratch defects. For illustrative purposes, shown in the schematic diagram of FIG. 4 is CMP polishing pad 51 that can rotate in the direction of arrow 53. The pad includes a plurality (two or more) of composite particles 11 at working surface 55 of the polishing pad.

The CMP pad can be made of a polymeric material. In specific examples, the pad is fabricated from a microcellular polyurethane or another suitable material. The CMP pad can be porous or non-porous.

In general, a porous polishing pad tends to provide improved slurry transport and localized slurry contact. Techniques for introducing porosity into pad materials include incorporating beads or hollow polymeric microspheres into the material. Microspheres-filled pads often have pore sizes greater than 20-30 microns, depending on the size of the microspheres. In some instances, a polymeric matrix used to manufacture the pad has been combined with polymeric microelements that soften or dissolve upon contact with a polishing slurry.

In other approaches, porosity is introduced through frothing techniques, such as for example, inert gas frothing. Gas frothing can produce wider pore size distributions, e.g., larger than 30 microns. In one example (see, e.g., U.S. Pat. No. 8,052,507, issued to Huang, et al. on Nov. 8, 2011) the froth incorporates a filler that, during operation of the pad, dissolves in the CMP slurry and imparts added porosity at the working surface of the pad.

In some embodiments, the metal oxide-polymer composite particles are distributed throughout the body of the CMP polishing pad. To prepare such polishing pads, metal oxide-polymer composite particles such as those described herein can be added at any suitable point during the fabrication of the pad. For example, the composite particles can be added to a liquid phase precursor, solvent, a froth, a frothing medium, and so forth. In certain cases metal oxide-polymer composite particles are added in a manner similar to that of incorporating conventional fillers (e.g., porosity inducing microspheres) and/or abrasive particles in CMP polishing pads.

In other embodiments, the composite particles are embedded at the working surface of the pad. For instance, metal oxide-polymer composite particles can be present in a coating (e.g., film or layer) at the working surface of the pad. Thus in some implementations, a conventional polishing pad or a polishing pad support is provided with a coating that consists of, consists essentially of or comprises metal oxide-polymer composite particles such as those described herein.

In specific examples, the pad has a coating that includes, in addition to composite particles, one or more materials such as, for example, a binder, additives, fillers, other abrasive particles and so forth. If a binder is used, the metal oxide-polymer composite particles can be homogeneously or inhomogeneously dispersed in the binder. The coating may further include a backing, friction layers, and/or other elements, as known in the art. In some cases, no backing is utilized. Conventional CMP tools that contain abrasive coatings are described, for instance, in U.S. Pat. No. 5,958,794, issued to Bruxvoort et al, on Sep. 28, 1999, which is incorporated herein by reference in its entirety.

The pad can be designed to provide desired properties such as rebound (a low rebound tending to absorb relatively high amounts of energy during cyclic deformation, causing less dishing during polishing and yielding better WID uniformity) and stiffness (an important consideration for WID uniformity and prolonged pad life). Additionally, the pad can be designed to offer a decreased tendency to glaze during polishing (reducing or minimizing the need for pad conditioning) and/or other characteristics.

The CMP polishing pad can be designed to have desired "damping" properties. Generally, damping refers to the ability of a material to absorb mechanical energy and can be measured by the Bashore rebound method, a simple technique for testing the rebound of a material. The Bashore rebound test is known in the art and is described, for instance, in the American Society for Testing and Materials (ASTM) Standard D-2632. In illustrative examples, the pad described herein has a Bashore rebound within the range of from about 25% to about 50%. Pads with other Bashore rebound values can be prepared. Use of pads modified with bound composite particles at their surfaces can leverage the composite particle properties to offset pad limitations and dissipate excessive stress or rebound without needing to design in that response to the foam pad.

Damping effects also can be described in terms of Energy Loss Factor (KEL), a parameter defined as the energy per unit volume lost in each deformation cycle. Generally, the higher the value of KEL for a pad, the lower the elastic rebound and the lower the observed dishing. To increase the KEL value, the pad can be made softer. However, this approach tends to also reduce the stiffness of the pad. The reduced stiffness results in decreased planarization efficiency and increases dishing or edge fastness (e.g. excessive edge material removal) due to conformation of the pad about the device corner as it passes under the edge of the device and then rebounds to contact the wafer.

Another approach for increasing the KEL value of the pad is to alter its physical composition in such a way that KEL is increased without reducing stiffness. This can be achieved by altering the composition of the hard segments (or phases) and the soft segments (or phases) in the pad and/or the ratio of the hard to soft segments (or phases) in the pad.

The slurry and/or tool described above can be used in processes for removing material from a substrate, typically through chemical and abrasive actions, to produce a processed surface. The process can further include operations designed to ready a substrate for processing and/or post processing steps. Examples include but are not limited to rough polishing, cleaning operations (e.g., post CMP cleaning), etching, metrology testing, pattern depositions and others.

In specific implementations, the process is characterized by increased removal rates, reduced defectivity count and/or increased cleanability with respect to a "comparative" process. As used herein, the term "comparative" process refers to a process that is the same as the process of the invention (also referred to herein as the experimental process) except with respect to the type of abrasive particles utilized. Whereas the experimental process is conducted with a slurry and/or tool that includes composite particles such as described herein, no such particles are present in the slurry or tool employed in the comparative process. Instead, the slurry and/or tool in the comparative process can include fumed silica, sol gel silica, or other conventional abrasive particles suitable for a given application. Except for the particles utilized, the experimental slurry or tool will typically contain the same or substantially the same components, in the same or substantially the same amounts, as the comparative slurry or tool. Both the comparative process and the process of the invention are carried out on the same type of substrate.

The following examples further illustrate the invention but, of course, should not be construed as in any way limiting its scope.

Example 1

This example demonstrates the preparation of a polyester latex in accordance with an embodiment of the invention.

To a 500 mL round bottom flask with overhead stirrer and thermocouple was added 50 g polyester resin (Reichold Fine-tone T-6694 resin, acid number 13 mg KOH/g resin, Tg=50-60° C.), 25 g methyl ethyl ketone, and 6.25 g isopropyl alcohol. The mixture was stirred at 250 rpm and maintained at 45° C. for 3 hours, after which 2.17 g 10% ammonium hydroxide solution (13.6 mmol) was added slowly. The mixture was stirred for a further five minutes, after which 5 g methacryloxypropyl-trimethoxysilane (MPS) was added. This mixture was stirred for 10 minutes, after which 150 g deionized water was slowly added to produce a dispersion. The mixture was heated to 95-98° C. and about 40 g liquid was distilled off. The heating mantle was removed and the reaction mixture cooled to room temperature.

Example 2

This example demonstrates the formation of organosilica-polyester composite particles in accordance with an embodiment of the invention.

Figure 5:
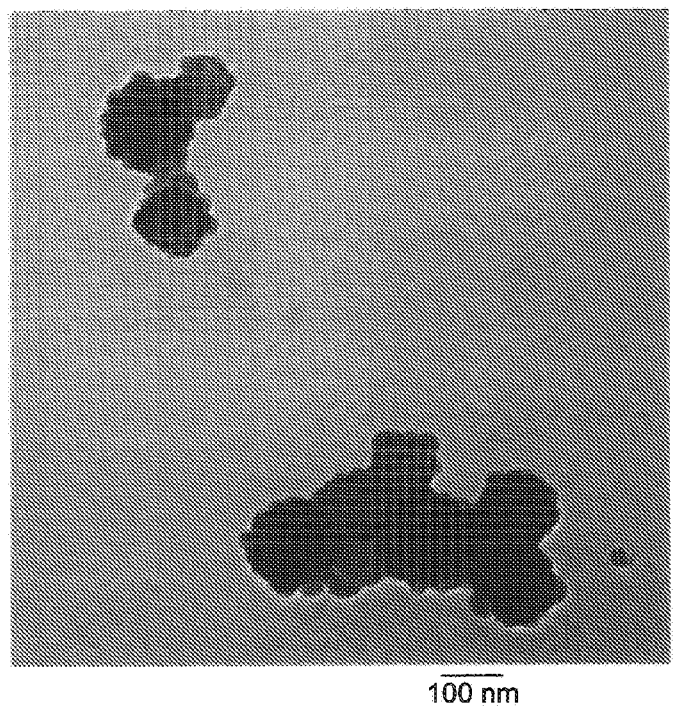
FIG. 5 is a transmission electron micrograph of composite particles described in Example 2 according to an embodiment of the invention.
Figure 6A:
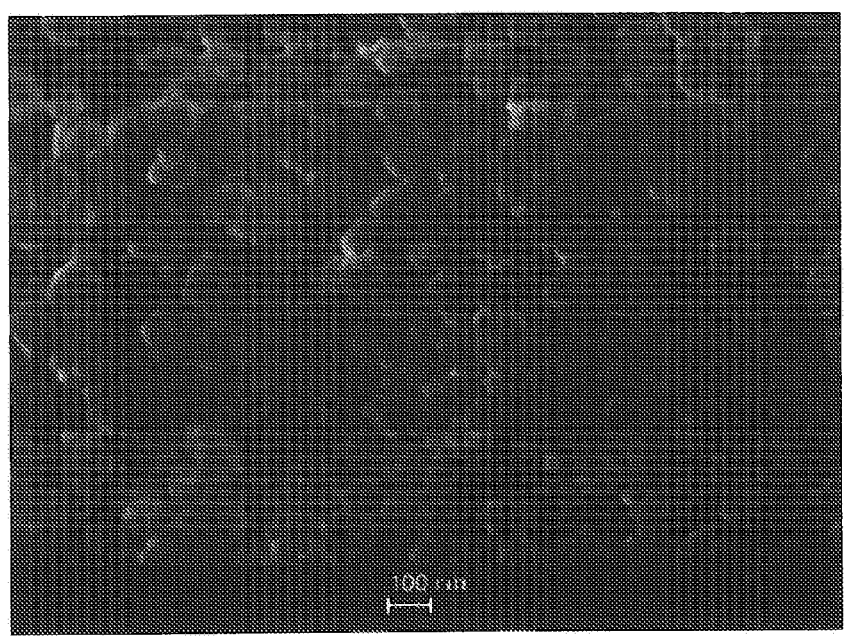
FIG. 6A is a scanning electron micrograph of composite particles described in Example 2 according to an embodiment of the invention.
Figure 6B:
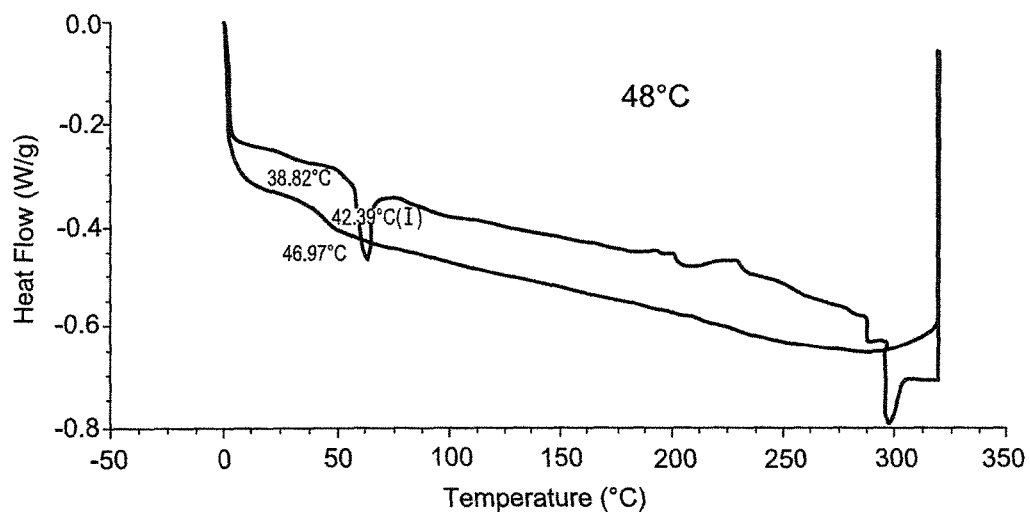
FIG. 6B is a differential scanning calorimetry profile of the composite particles shown in FIG. 6A.

38 g of the latex from Example 1 (26.4 wt % polyester+MPS) was diluted with 162 g deionized water to form a 5 wt % dispersion. 5 g of vinyltrimethoxysilane (VTMS, MW 148, 34 mmol) was dissolved in 25 g deionized water and stirred with a magnetic stir bar (300 rpm) for ~60 min until the organic droplets were completely dissolved and a transparent solution was obtained. 1 g of 30% ammonium hydroxide solution (MW=34) was added to the diluted latex dispersion and mechanically stirred for 5 min. The VTMS solution was added over one minute and the reaction allowed to proceed for 3 hours at room temperature. A second solution of VTMS, identical to the first, was prepared and added to the reaction mixture, and the reaction was allowed to proceed for an additional 3 hours. Transmission electron microscopy of the resulting particle dispersion is shown in FIG. 5. The resulting composite particles were recovered by evaporation of the solvent at room temperature. Scanning electron microscopy of the resulting powder is shown in FIG. 6A, the thermal profile measured by differential scanning calorimetry (DSC) is shown in FIG. 6B.

Example 3

This example demonstrates formation of organosilica-polyester composite particles in accordance with an embodiment of the invention.

The latex of Example 1 was prepared without addition of MPS to the polymer/solvent solution. Rather, 1 g of MPS was added to 40 g of the latex (about 25 wt % polymer) and stirred for 2 hours until the MPS droplets disappeared. Then, 160 g deionized water was added to dilute the dispersion to 5 wt % polymer. A VTMS solution was prepared as in Example 2. 1 g of 30% ammonium hydroxide solution (MW=34) was added to the diluted latex dispersion and mechanically stirred for 5 min. The VTMS solution was added over one minute and the reaction allowed to proceed for 3 hours at room temperature. A second solution of VTMS, identical to the first, was prepared and added to the reaction mixture, and the reaction was allowed to proceed for an additional 5 hours. The resulting composite particles were recovered by evaporation of the solvent at room temperature.

Example 4

This example demonstrates preparation of crosslinked polyester/MPS/organosilica particles in accordance with an embodiment of the invention.

200 grams of Fine-Tone T6694 polyester resin, 100 grams of 2-butanone (MEK) and 25 grams of isopropanol (IPA) were dissolved at 60° C. and stirred for about 2 hours. 8.68 grams of ammonium hydroxide ($NH_4OH$, 10 wt %) was added and stirred for 10 minutes, then 20 grams of MPS was added to the stirring solution and stirred for another 10 minutes. Next, 600 grams of deionized water was slowly dripped into the polyester solution over the course of 2-3 hours. The water immediately emulsified in the organic phase until a critical point was reached and the emulsion flipped to become an oil-in-water emulsion, at which point the viscosity of the dispersion dropped drastically. The final product had the consistency of water and was a milky white with a slight blue coloration around the edges.

A distillation receiver was set up with a connected reflux condenser to the stirring dispersion. The temperature was increased to 90° C., allowing the volatiles to be removed and collected in a Nalgene bottle for weight measurement. Distillation continued until just greater than 125 grams of solvent was collected (close to 130 grams) in order to be sure all volatiles were removed. The particle size distribution was measured by dynamic light scattering (DLS) and was d10=103 nm, d50=134 nm, d90=185 nm.

Polymerization of Particles.

In a 500 mL 4 necked round bottom flask, 170.53 grams of stock particle dispersion (29.32 wt %) was combined with 29.47 grams of deionized water to bring to total weight to 200 grams. Next, 0.5 grams of azobisbutyronitrile (AIBN) was dissolved in ~6 grams of methanol. While the AIBN was dissolving, a stream of nitrogen gas was bubble through the stirring particle dispersion for about 20 minutes to remove any dissolved oxygen. The dispersion was then heated to 70° C. and the AIBN solution was added dropwise to the hot stirring dispersion. The polymerization was run for 15 hours in order to ensure completion. The particle size distribution was again measured by DLS and was d10=104 nm, d50=137 nm, d90=181 nm.

Organosilica Growth.

Figure 7A:
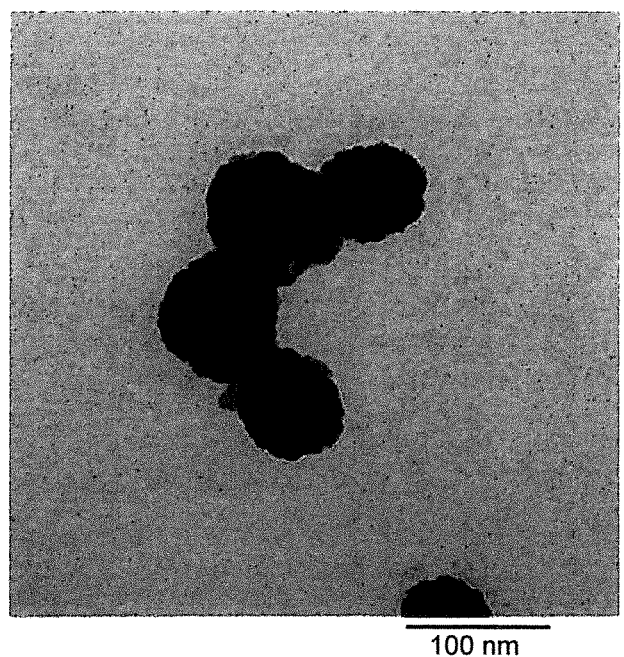
FIGS. 7A and 7B are two different transmission electron micrographs of composite particles described in Example 4 according to an embodiment of the invention.
Figure 7B:
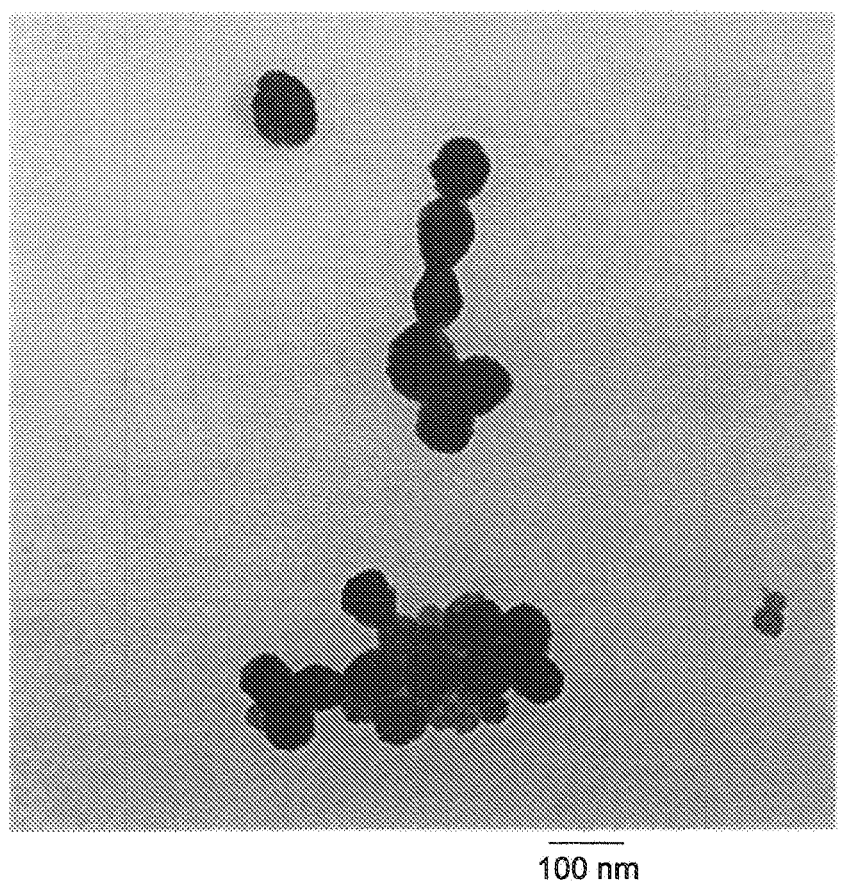
Figure 8:
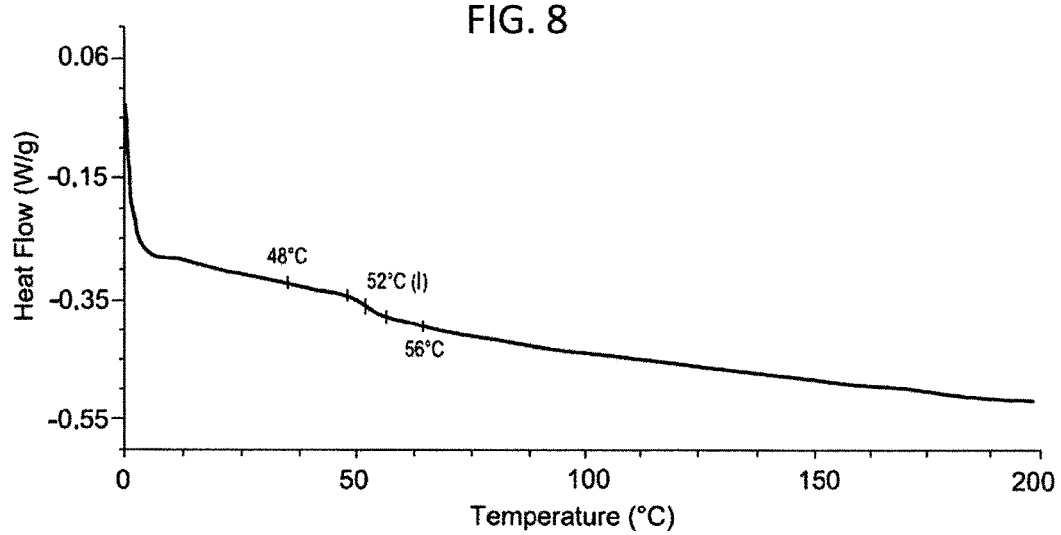
FIG. 8 is a thermal profile of the composite particles shown in FIG. 7 as measured by DSC.

In a 30 mL Nalgene bottle containing a stirbar, 5 grams of vinyltrimethoxysilane (VTMS) was mixed with 25 grams of deionized water and stirred at room temperature for 60 minutes. Near the end of the hour, in a 1 Liter round bottom flask with a stirbar, 24.5 grams of stock polymerized particles (23.55 wt %) were mixed with 157.5 grams of deionized water followed by addition of 1 gram of 28% ammonium hydroxide ($NH_4OH$). The hydrolyzed VTMS solution was added dropwise over ~5 minutes to the stirring basic particle dispersion and left stirring for 3 hours. After 2 hours of stirring, a second batch of 5 grams VTMS and 25 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was left stirring for 3 hours to finish organosilica growth on the polymerized particles. The particle size as measured by DLS was d10: 103.6 nm; d50: 156.7 nm, d90: 229.6 nm. Electron micrographs of the particles are shown in FIG. 7. The thermal profile of the material measured by DSC is shown in FIG. 8.

Additional particles were produced according to this method and analyzed by TEM and CP/CPMG/MAS $^{29}$Si NMR. The roundness measured according to the method set forth in Example 9 was 1.31+/−0.17. The NMR spectrum is shown in FIGS. 9 A and B. The ratio of T3/T2 units is 5.4:1, indicating the VTMS is 84% condensed.

Example 5

This example demonstrates preparation of crosslinked polyester/MPS/organosilica with 10 wt % styrene in accordance with an embodiment of the invention.

200 grams of Fine-Tone T6694 polyester resin, 100 grams of 2-butanone (MEK) and 25 grams of isopropanol (IPA) were dissolved at 60° C. and stirred for about 2 hours. 8.68 grams of ammonium hydroxide ($NH_4OH$, 10 wt %) was added and stirred for 10 minutes, then 20 grams of MPS was added to the stirring solution and stirred for another 10 minutes. Next, 600 grams of deionized water was slowly dripped into the polyester solution over the course of 2-3 hours. The water immediately emulsified in the organic phase until a critical point was reached and the emulsion inverted to become an oil-in-water emulsion, at which point the viscosity of the dispersion dropped drastically. The final product had the consistency of water was a milky white with a slight blue coloration around the edges.

A distillation receiver was set up with a connected reflux condenser to the stirring dispersion. The temperature was increased to 90° C., allowing the volatiles to be removed and collected in a Nalgene bottle for weight measurement. Distillation continued until just greater than 125 grams of solvent was collected (close to 130 grams) in order to be sure all volatiles were removed. The particle size distribution was measured by dynamic light scattering (DLS) and was d10=73.1 nm, d50=113.6 nm, d90=182.5 nm.

Diffusion of Styrene and Polymerization.

In a 500 mL 4 necked round bottom flask, 118 grams of stock particle dispersion (21.17 wt %) was combined with 132 grams of deionized water to bring to total weight to 250 grams. Oxygen was purged from the dispersion by bubbling nitrogen gas through the stirring mixture for 20 min. Next, 0.25 grams of azobisbutyronitrile (AIBN) was dissolved in ~2.5 grams of styrene by adding one drop of acetonitrile and vortexing vigorously. The styrene/AIBN solution was added dropwise to the stirring dispersion and then left stirring for 60 minutes at room temperature to allow the styrene to diffuse into the particles. After diffusion, the temperature was increased to 80° C. and the dispersion was polymerized for 6 hours. The particle size distribution was again measured by DLS and was d10=76.9 nm, d50=113.1 nm, d90=172.8 nm.

Organosilica Growth.

In a 30 mL Nalgene bottle containing a stirbar, 5 grams of vinyltrimethoxysilane (VTMS) was mixed with 25 grams of deionized water and stirred at room temperature for 60 minutes. Near the end of the hour, in a 1 liter round bottom flask with a stirbar, 100 grams of stock polymerized particles (10 wt %) were mixed with 100 grams of deionized water followed by addition of 1 gram of 28% ammonium hydroxide ($NH_4OH$). The hydrolyzed VTMS solution was added dropwise over ~5 minutes to the stirring basic particle dispersion and left stirring for 3 hours. After 2 hours of stirring, a second batch of 5 grams VTMS and 25 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was left stirring for 3 hours to finish organosilica growth on the polymerized particles. The particle size distribution was again measured by DLS and was d10:77.2 nm; d50: 115.1 nm; d90: 184.0 nm.

Example 6

This example demonstrates preparation of crosslinked polyester/MPS/organosilica with 40% styrene in accordance with an embodiment of the invention.

150 grams of Fine-Tone T6694 polyester resin was dissolved in 75 grams of 2-butanone (MEK) and 18.75 grams of isopropanol (IPA) at 60° C. and stirred for about 2 hours. 6.5 grams of ammonium hydroxide ($NH_4OH$, 10 wt %) was added and stirred for 10 minutes, following which 15 grams of MPS was added to the stirring solution and left stirring for about five minutes. 60 grams of styrene was then added to the stirring solution and left stirring for an additional 5 minutes. Next, 450 grams of deionized water was slowly dripped into the polyester solution over the course of 2-3 hours. The water immediately emulsified in the organic phase until a critical point is reached and the emulsion flipped to become an oil-in-water emulsion, at which point the viscosity of the dispersion dropped drastically. The final product had the consistency of water and was a milky white with a slight blue coloration around the edges.

A distillation receiver was set up with a connected reflux condenser to the stirring dispersion. The temperature was increased to 90° C., allowing the volatiles to be removed and collected in a Nalgene bottle for weight measurement. Distillation continued until just about 100 grams of solvent was collected in order to be sure all volatiles were removed. The particle size distribution was measured by dynamic light scattering (DLS) and was d10=116.2 nm, d50=161.7 nm, d90=232.5 nm.

Polymerization: The dispersion was sparged with nitrogen gas for about 20 minutes. About 2 g AIBN was dissolved in methanol with the aid of 2-3 drops of acetonitrile. The sparged dispersion was brought to 80° C. and the initiator solution added dropwise. The dispersion was stirred for 6 hours, following which the heating mantle was turned off and the reaction allowed to proceed overnight at ambient temperature to produce a solution of polymerized particles.

Figure 10:
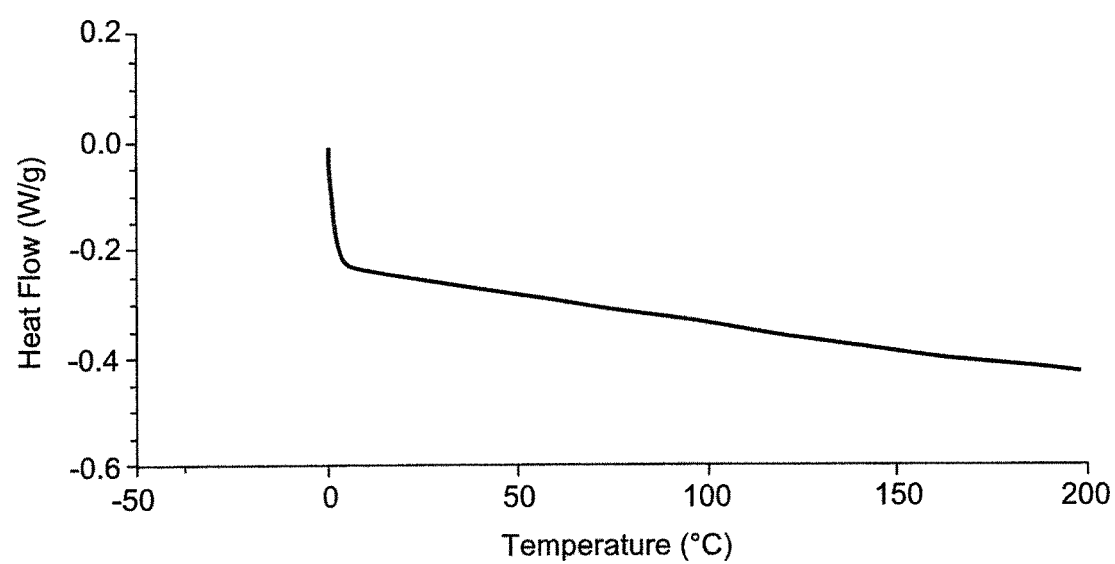
FIG. 10 is the DSC profile of composite particles described in Example 6 according to an embodiment of the invention.
Figure 11A:
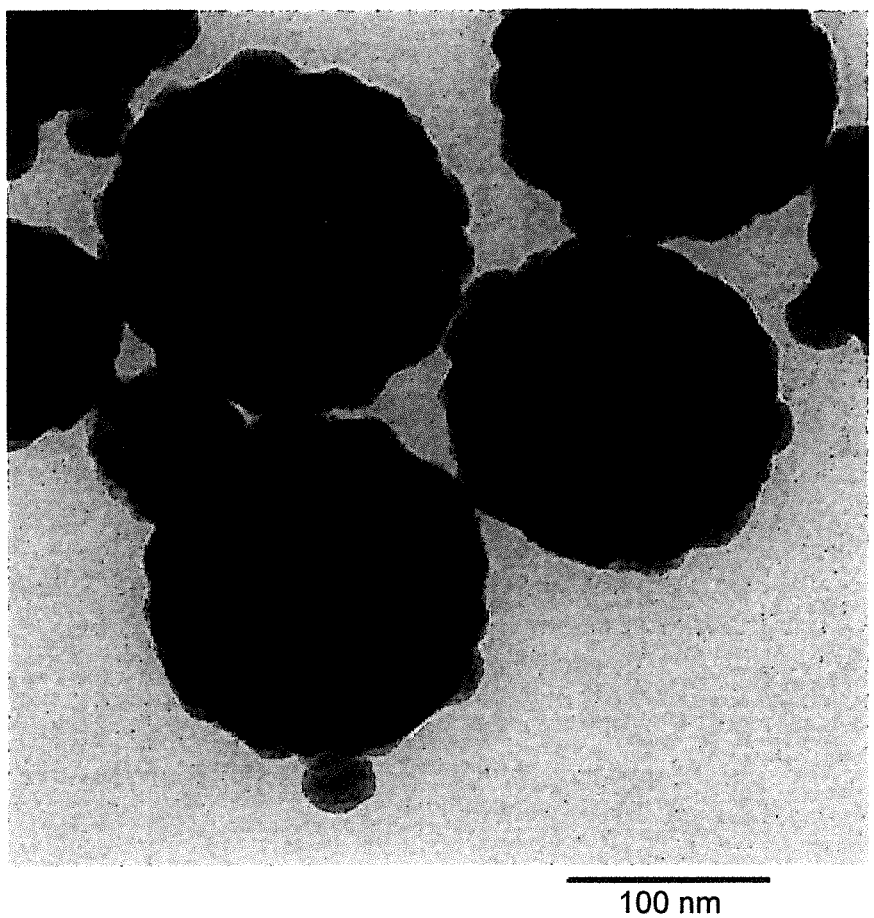
FIGS. 11A and 11B are SEM micrographs with different scales of composite particles described in Example 6 according to an embodiment of the invention.
Figure 11B:
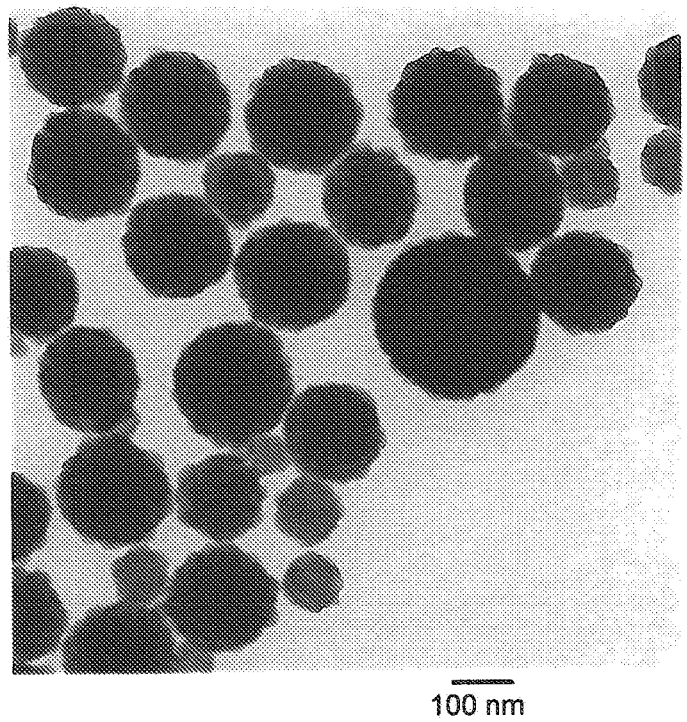

Organosilica growth. In a 500 mL Nalgene bottle containing a stirbar, 50 grams of vinyltrimethoxysilane (VTMS) was mixed with 250 grams of deionized water and stirred at room temperature for 60 minutes. Near the end of the hour, in a 3 liter round bottom flask with a stirbar, 347.38 grams of stock polymerized particles (28.77 wt %) were mixed with about 1500 grams of deionized water followed by addition of 10 gram of 28% ammonium hydroxide ($NH_4OH$). The hydrolyzed VTMS solution was added dropwise over ~5 minutes to the stirring basic particle dispersion and left stirring for 3 hours. After 2 hours of stirring, a second batch of 50 grams VTMS and 250 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was left stirring for 3 hours to finish organosilica growth on the polymerized particles. The particle size distribution was again measured by DLS and was d10: 141.8 nm; d50: 202.7 nm; d90: 356.0 nm. DSC was performed on the particles and the resulting thermal profile is shown in FIG. 10. SEM micrographs of the particles are shown in FIG. 11.

Example 7

This example demonstrates preparation of composite particles with styrene-acrylate resin in accordance with an embodiment of the invention.

In a 500 mL Nalgene bottle containing a stirbar, 50 grams of vinyltrimethoxysilane (VTMS) was mixed with 250 grams of deionized water and stirred at room temperature for 60 minutes. Near the end of the hour, in a 2 Liter round bottom flask with a stirbar, 102 grams of stock Joncryl 631 (48.71 wt % from BASF) was mixed with 800 grams of deionized water followed by addition of 5 grams of 28% ammonium hydroxide ($NH_4OH$). The hydrolyzed VTMS solution was added dropwise over ~5 minutes to the stirring basic Joncryl dispersion and let stir for 3 hours. After 2 hours of stirring, a second batch of 50 grams VTMS and 250 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was let stir for 3 hours to finish organosilica growth on the Joncryl particles. The particle size distribution was measured by DLS and was d10: 73.1 nm, d50=115 nm, d90=222 nm. The particle size distribution and an electron micrograph are shown in FIGS. 12A and B.

The dispersion was diafiltered using a GE Healthcare Hollow Fiber Cartridge (Model # UFP-500-E-4MA) with a 500,000 NMWC and a 420 $cm^2$ surface area, coupled to a Masterflex Easy Load II pump (Model #77200-60) using a Masterflex Standard Drive motor. The dispersion was pumped through the filter cartridge which caused water and dissolved ions to be removed. Deionized water was added to the dispersion as the liquid level decreased to replace the lost water. The dispersion was diafiltered until the measured conductance of the supernatant was <100 μs. 300 grams of the diafiltered composite particle dispersion (13.56 wt %) was heated to 70° C. and 6 grams of hexamethyldisilazane (HMDZ) was added to the stirring solution. The mixture was stirred overnight at 300 rpm for full treatment with HMDZ. The particle size distribution is shown in FIG. 12C and was d10=82.0 nm; d50=129.5 nm; d90=194.9 nm.

Example 8

This example demonstrates preparation of composite particles with styrene-acrylate resin in accordance with an embodiment of the invention.

In a 500 mL Nalgene bottle containing a stirbar, 25 grams of vinyltrimethoxysilane (VTMS) was mixed with 250 grams of deionized water and stirred at room temperature for 60 minutes. Near the end of the hour, in a 2 Liter round bottom flask with a stirbar, 102 grams of stock Joncryl 631 (48.71 wt % from BASF) was mixed with 800 grams of deionized water followed by addition of 5 grams of 28% ammonium hydroxide ($NH_4OH$). The hydrolyzed VTMS solution was added dropwise over ~5 minutes to the stirring basic Joncryl dispersion and let stir for 3 hours. After 2 hours of stirring, a second batch of 25 grams VTMS and 250 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was let stir for 3 hours to finish organosilica growth on the Joncryl particles. The particle size distribution was measured by DLS and was d10=80.1 nm; d50=120.5 nm; d90=180.1 nm. The DSC results and an electron micrograph are shown in FIGS. 13A and B.

Example 9

This example demonstrates preparation of composite particles in accordance with an embodiment of the invention.

In a 500 mL Nalgene bottle containing a stirbar, 50 grams of vinyltrimethoxysilane (VTMS) was mixed with 250 grams of deionized water and stirred at room temperature for 60 minutes. Near the end of the hour, in a 3 liter round bottom flask with a stirbar, 313 grams of stock polymerized particles (28.77 wt %) from Example 6 were mixed with about 1487 grams of deionized water followed by addition of 10 gram of 28% ammonium hydroxide ($NH_4OH$). The hydrolyzed VTMS solution was added dropwise over ~5 minutes to the stirring basic particle dispersion and left stirring for 3 hours. After 2 hours of stirring, a second batch of 50 grams VTMS and 250 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was left stirring for 3 hours to finish organosilica growth on the polymerized particles. The particle size distribution was again measured by DLS and was d10: 135.7 nm; d50: 194.8 nm; d90: 363 nm.

Roundness was determined by analysis of >500 particles dropped on a TEM grid. Centrifugation was sometimes used to clean up the sample prior to preparation. The particles were imaged on a JEOL 1200 operated at 80 kV. Image-Pro™ software from MediaCybernetics was used to analyze the images and calculate perimeter and area to calculate Roundness ($Perimeter^2/(4\pi*Area)$). The images required occasional editing to eliminate particles that were touching one another. The particle roundness was 1.21+/−0.08.

Example 10

This example demonstrates preparation of composite particles in accordance with an embodiment of the invention.

In a Nalgene bottle containing a stirbar, 100 grams of vinyltrimethoxysilane (VTMS) was mixed with 500 grams of deionized water and stirred at room temperature for 60 minutes. Near the end of the hour, in a round bottom flask with a stirbar, about 200 grams of stock Joncryl 631 (48.71 wt % from BASF) was mixed with 1800 grams of deionized water followed by addition of 10 grams of 28% ammonium hydroxide ($NH_4OH$). The hydrolyzed VTMS solution was added dropwise over ~5 minutes to the stirring basic Joncryl dispersion and let stir for 3 hours. After 2 hours of stirring, a second batch of 100 grams VTMS and 500 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was let stir for 3 hours to finish organosilica growth on the Joncryl particles. The particle size distribution was measured by DLS and was d10: 88.4 nm, d50=120.8 nm, d90=259.9 nm. Roundness was measured as described in Example 9 and was 1.36+/−0.15.

Example 11

This example demonstrates preparation of composite particles in accordance with an embodiment of the invention.

In a round bottom flask with overhead stirrer and thermocouple, 200 g polyester resin (Reichold Fine-tone T-6694 resin, acid number 13 mg KOH/g resin, Tg=50-60° C.) was combined with 100 g methyl ethyl ketone and 25 g isopropyl alcohol. The mixture was stirred at 60° C. for 2 hours, after which 8.68 g of 10% ammonium hydroxide solution was added slowly. The mixture was stirred for a further five minutes, after which 20 g methacryloxypropyl-trimethoxysilane (MPS) was added. This mixture was stirred for 10-15 minutes, after which 600 g deionized water was slowly added, producing a dispersion. The mixture was heated to 93° C. and to distill off the volatile components. The heating mantle was removed and the reaction mixture cooled to room temperature.

Organosilica growth: 381.4 g of the latex from Example 1 (26.2 wt % polyester+MPS) was diluted with 1618.61 g deionized water to form a 5 wt % dispersion. 50 g of VTMS was allowed to hydrolyze in 250 g deionized water for one hour, following which 10 g of 30 wt % ammonium hydroxide was slowly added and the solution allowed to stir for five minutes. The VTMS solution was added to the latex over five minutes, and the reaction was allowed to proceed at 3 hours at room temperature. A second solution of VTMS, identical to the first, was prepared and added to the reaction mixture. The reaction was allowed to proceed for an additional 3 hours. The particle size distribution of the resulting particles was d10=177.9 nm, d50=243.5 nm, and d90=343 nm. Additional particles were produced according to the methods of this Example, and their roundness measured according to Example 9 was 1.43+/−0.18.

Example 12

This example demonstrates the preparation of composite particles from combining Finetone-MPS particles, polyurethane particles (R4289 polyurethane dispersion from Essential Industries), or polyurethane (Neorez R551 polyurethane from DSM Resins) particles with vinyltrimethoxysilane, allyltrimethoxysilane, trimethoxymethylsilane, or trimethoxypropylsilane.

Silica Growth on Finetone/MPS Particles
VTMS as Silane Compound 38 g of the latex from Example 1 (26.4 wt % polyester+MPS) was diluted with 162 g deionized water to form a 5 wt % dispersion. 5 g of vinyltrimethoxysilane (VTMS, MW 148, 34 mmol) was dissolved in 12.5 g deionized water and stirred with a magnetic stir bar (300 rpm) for ~60 min until the organic droplets were completely dissolved and a transparent solution was obtained. 1 g of 30% ammonium hydroxide solution (MW=34) was added to the diluted latex dispersion and mechanically stirred for 5 min. The VTMS solution was added over one minute and the reaction allowed to proceed at 3 hours at room temperature. A second solution of VTMS, identical to the first, was prepared and added to the reaction mixture, and the reaction was allowed to proceed for an additional 3 hours.

ATMS as Silane Compound 19 g of the latex from Example 1 (26.4 wt % polyester+MPS) was diluted with 81 g deionized water to form a 5 wt % dispersion. 2.5 g of allyltrimethoxysilane (ATMS, MW 162, 13 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The ATMS solution was added over one minute and the reaction allowed to proceed at 3 hours at room temperature. A second solution of ATMS, identical to the first, was prepared and added to the reaction mixture, and the reaction was allowed to proceed for an additional 3 hours.

TMMS as Silane Compound 19 g of the latex from Example 1 (26.4 wt % polyester+MPS) was diluted with 81 g deionized water to form a 5 wt % dispersion. 2.5 g of trimethoxymethylsilane (TMMS, MW 136, 18.4 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMMS solution was added over one minute and the reaction allowed to proceed at 3 hours at room temperature. A second solution of TMMS, identical to the first, was prepared and added to the reaction mixture, and the reaction was allowed to proceed for an additional 3 hours.

TMPS as Silane Compound 19 g of the latex from Example 1 (26.4 wt % polyester+MPS) was diluted with 81 g deionized water to form a 5 wt % dispersion. 2.5 g of trimethoxy(propyl)silane (TMPS, MW 164, 15.3 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMPS solution was added over one minute and the reaction allowed to proceed at 3 hours at room temperature. A second solution of TMPS, identical to the first, was prepared and added to the reaction mixture, and the reaction was allowed to proceed for an additional 3 hours.

Silica Growth on PU (SMPP157) Particles
VTMS as Silane Compound 15.6 g of the latex from polyurethane stock (R4289 dispersion, 32 wt % polyurethane) was diluted with 84.4 g deionized water to form a 5 wt % dispersion. 2.5 g of vinyltrimethoxysilane (VTMS, MW 148, 17 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The VTMS solution was added over one minute and the reaction allowed to proceed at 3 hours at room temperature. A second solution of VTMS, identical to the first, was prepared and added to the reaction mixture, and the reaction was allowed to proceed for an additional 3 hours.

ATMS as Silane Compound 15.6 g of the latex from polyurethane stock (R4289 dispersion, 32 wt % polyurethane) was diluted with 84.4 g deionized water to form a 5 wt % dispersion. 2.5 g of allyltrimethoxysilane (ATMS, MW 162, 15.5 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The ATMS solution was added over one minute and the reaction allowed to proceed at 3 hours at room temperature. A second solution of ATMS, identical to the first, was prepared and added to the reaction mixture, and the reaction was allowed to proceed for an additional 3 hours.

TMMS as Silane Compound 15.6 g of the latex from polyurethane stock (R4289 dispersion, 32 wt % polyurethane) was diluted with 84.4 g deionized water to form a 5 wt % dispersion. 2.5 g of trimethoxymethylsilane (TMMS, MW 136, 18.4 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMMS solution was added over one minute and the reaction allowed to proceed at 3 hours at room temperature. A second solution of TMMS, identical to the first, was prepared and added to the reaction mixture, and the reaction was allowed to proceed for an additional 3 hours.

TMPS as Silane Compound 15.6 g of the latex from polyurethane stock (R4289 dispersion, 32 wt % polyurethane) was diluted with 84.4 g deionized water to form a 5 wt % dispersion. 2.5 g of trimethoxy(propyl)silane (TMPS, MW 164, 15.3 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMPS solution was added over one minute and the reaction allowed to proceed at 3 hours at room temperature. A second solution of TMPS, identical to the first, was prepared and added to the reaction mixture, and the reaction was allowed to proceed for an additional 3 hours.

Silica Growth on PU (Neorez R551) Particles

VTMS as Silane Compound 14.6 g of the latex from polyurethane stock (Neorez R551 dispersion, 34.3 wt % polyurethane) was diluted with 85.4 g deionized water to form a 5 wt % dispersion. 2.5 g of vinyltrimethoxysilane (VTMS, MW 148, 17 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The VTMS solution was added over one minute and the reaction allowed to proceed at 3 hours at room temperature. A second solution of VTMS, identical to the first, was prepared and added to the reaction mixture, and the reaction was allowed to proceed for an additional 3 hours.

ATMS as Silane Compound 14.6 g of the latex from polyurethane stock (Neorez R551 dispersion, 34.3 wt % polyurethane) was diluted with 85.4 g deionized water to form a 5 wt % dispersion. 2.5 g of allyltrimethoxysilane (ATMS, MW 162, 15.5 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The ATMS solution was added over one minute and the reaction allowed to proceed at 3 hours at room temperature. A second solution of ATMS, identical to the first, was prepared and added to the reaction mixture, and the reaction was allowed to proceed for an additional 3 hours.

TMMS as Silane Compound 14.6 g of the latex from polyurethane stock (Neorez R551 dispersion, 34.3 wt % polyurethane) was diluted with 85.4 g deionized water to form a 5 wt % dispersion. 2.5 g of trimethoxymethylsilane (TMMS, MW 136, 18.4 mmol) was dissolved in 12.5 g deionized water and stirred with a magnetic stir bar (300 rpm) for ~60 min until the organic droplets were completely dissolved and a transparent solution (MW=34) was added to the diluted latex dispersion and mechanically stirred for 5 min. The TMMS solution was added over one minute and the reaction allowed to proceed at 3 hours at room temperature. A second solution of TMMS, identical to the first, was prepared and added to the reaction mixture, and the reaction was allowed to proceed for an additional 3 hours.

TMPS as Silane Compound 14.6 g of the latex from polyurethane stock (Neorez R551 dispersion, 34.3 wt % polyurethane) was diluted with 85.4 g deionized water to form a 5 wt % dispersion. 2.5 g of trimethoxy(propyl)silane (TMPS, MW 164, 15.3 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMPS solution was added over one minute and the reaction allowed to proceed at 3 hours at room temperature. A second solution of TMPS, identical to the first, was prepared and added to the reaction mixture, and the reaction was allowed to proceed for an additional 3 hours.

The particle size distribution of representative composite particles described in this Example are set forth in Table 1. The particle sizes were determined by dynamic light scattering.

TABLE 1

| Silane | Base polymer* | d10 | d50 | d90 |
|---|---|---|---|---|
| VTMS | R4289 | 31.2 | 48.4 | 71.7 |
| TMMS | Finetone/MPS | 178 | 302 | 543 |
| ATMS | Finetone/MPS | 183 | 260 | 350 |
| TMPS | Finetone/MPS | 173 | 296 | 400 |
| TMMS | R4289 | 29 | 46 | 67 |
| TMPS | R4289 | 29 | 46 | 70 |
| ATMS | R4289 | 34 | 48 | 68.5 |
| VTMS | Neorez R551 | 19.9 | 30 | 47 |
| TMPS | Neorez R551 | 21 | 32 | 48.5 |
| ATMS | Neorez R551 | 24 | 34.7 | 47.8 |
| TMMS | Neorez R551 | 18.3 | 29.4 | 44.5 |
| Control | Neorez R551 | 10.4 | 16.2 | 36.6 |
| Control | R4289 | 24.2 | 40.6 | 65.6 |

*R4289 and Neorez R551 are polyurethane dispersions. Finetone/MPS is Finetone polyester treated with methacryloxypropyltrimethoxysilane.

Example 13

This example demonstrates the attempted preparation of a composite particle using tetraethylorthosilicate ("TEOS") in place of an organosilane compound.

A polyester dispersion was prepared using the procedure of Example 1 with 38 g of polyester containing 26.4% solid in water and methacryloxypropylsilane. The dispersion was diluted with 162 g of deionized water. To the diluted dispersion was added 1 g of 30% ammonia. The pH of the mixture was about 10.2 The dispersion was mixed at 300 rpm with an overhead mixer for 5 min.

15 g of TEOS was added dropwise over 15-20 min while stirring. After the TEOS addition was complete, the mixture was further stirred at room temperature overnight.

After stirring overnight, a large mass of white solid was floating in the mixture. A TEM image of a sample of the liquid phase is depicted in FIG. 18. The image indicates that organosilica was not formed on the polyester particles.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A process for removing material from a substrate through chemical and abrasive actions, the process comprising:
removing material from a substrate with a polishing pad or slurry composition, wherein the polishing pad, or the slurry composition, or both comprise composite particles comprising core particles having organosilica particles disposed about the core particles, wherein the organosilica particles have a molar ratio of C to Si of 0.5 or greater.

2. The process of claim 1, wherein the core particles comprise an inorganic material, an organic material, or both.

3. The process of claim 1, wherein the organosilica particles are derived via reaction of an organosilane compound having the formula $R^1SiR^2{}_3$, wherein $R^1$ is $C_1$-$C_4$ alkyl, $C_2$-$C_4$ alkenyl, or $C_2$-$C_4$ alkynyl and wherein $R^2$ is alkoxy, chloro, bromo, or iodo.

4. The process of claim 1, wherein the composite particles have a roundness R of from 1.1 to 2.0, wherein the roundness is determined by the formula: $R=P^2/(4\pi S)$ wherein P is the perimeter of a cross-section of the particle and wherein S is the cross-sectional area of the particle.

5. A CMP slurry composition comprising composite particles comprising core particles having organosilica particles disposed about the core particles dispersed in an aqueous media, wherein the organosilica particles have a molar ratio of C to Si of 0.5 or greater.

6. The CMP slurry composition of claim 5, wherein core particles include an inorganic material, an organic material, or both.

7. The CMP slurry composition of claim 5, wherein the CMP slurry composition further comprises a surfactant, a rheological agent, a corrosion inhibitor, an oxidizing agent, a chelating agent, a complexing agent, particles other than the metal oxide-polymer composite particles, or any combination thereof.

8. The CMP slurry composition of claim 5, wherein the composite particles further comprise one or more ingredients selected from the group consisting of a CMP chemical etchant, a CMP processing accelerator, and a CMP passivating agent.

9. The CMP slurry composition of claim 5, wherein the core particles comprise an organic material.

10. The CMP slurry composition of claim 5, wherein the organosilica particles are derived via reaction of an organosilane compound having the formula $R^1SiR^2{}_3$, wherein $R^1$ is $C_1$-$C_4$ alkyl, $C_2$-$C_4$ alkenyl, or $C_2$-$C_4$ alkynyl and wherein $R^2$ is alkoxy, chloro, bromo, or iodo.

11. The CMP slurry composition of claim 10, wherein the organosilane compound has a formula: $R^1SiR^2{}_3$, wherein $R^1$ is $C_1$-$C_4$ alkyl, $C_2$-$C_4$ alkenyl, or $C_2$-$C_4$ alkynyl and wherein $R^2$ is alkoxy, chloro, bromo, or iodo.

12. The CMP slurry composition of claim 5, wherein the composite particles have a roundness R of from 1.1 to 2.0, wherein the roundness is determined by the formula: $R=P^2/(4\pi S)$ wherein P is the perimeter of a cross-section of the particle and wherein S is the cross-sectional area of the particle.

13. A CMP polishing pad comprising composite particles comprising core particles having organosilica particles disposed about the core particles, wherein the organosilica particles have a molar ratio of C to Si of 0.5 or greater.

14. The CMP polishing pad of claim 13, wherein the core particles comprise an inorganic material, an organic material, or both.

15. The CMP polishing pad of claim 13, wherein the organosilica particles are derived via reaction of an organosilane compound having the formula $R^1SiR^2{}_3$, wherein $R^1$ is $C_1$-$C_4$ alkyl, $C_2$-$C_4$ alkenyl, or $C_2$-$C_4$ alkynyl and wherein $R^2$ is alkoxy, chloro, bromo, or iodo.

16. The CMP polishing pad of claim 13, wherein the composite particles have a roundness R of from 1.1 to 2.0, wherein the roundness is determined by the formula: $R=P^2/(4\pi S)$ wherein P is the perimeter of a cross-section of the particle and wherein S is the cross-sectional area of the particle.

17. A process for preparing a composition for CMP comprising:
preparing composite particles by:
(a) providing an aqueous dispersion comprising polymer particles and a surface agent, the aqueous dispersion having a pH of 8 or more,
(b) adding an aqueous mixture comprising an at least partially hydrolyzed organosilane compound to the aqueous dispersion to form a mixture, wherein the organosilane compound has a formula: $R^1SiR^2{}_3$, wherein $R^1$ is $C_1$-$C_4$ alkyl, $C_2$-$C_4$ alkenyl, or $C_2$-$C_4$ alkynyl and wherein $R^2$ is alkoxy, chloro, bromo, or iodo, and (c) forming the aqueous dispersion of composite particles via production of organosilica particles by a reaction of the at least partially hydrolyzed organosilane compound, wherein the organosilica particles have a molar ratio of C to Si of 0.5 or greater; and formulating the composite particles into a composition for CM'.

18. The method of claim 17, wherein providing comprises adjusting the pH of an aqueous dispersion comprising polymer particles and a surface agent to a pH of 8 or more.

19. The method of claim 17, wherein providing comprises combining an aqueous dispersion of polymer particles with an ethylenically unsaturated monomer, allowing the monomer to migrate into the polymer particles, and polymerizing the monomer.

20. The method of claim 17, wherein providing comprises dissolving a polymer in solvent, adding water to form an oil in water emulsion, and distilling the solvent from the emulsion to form an aqueous dispersion of polymer particles.

21. The method of claim 20, wherein dissolving comprises dissolving the polymer and an ethylenically unsaturated monomer, the surface agent, or both in the solvent.

22. The method of claim 20, further comprising adding the surface agent to the aqueous dispersion after distilling the solvent.

23. The method of claim 20, further comprising, after distilling, adding an ethylenically unsaturated monomer to the emulsion, allowing the monomer to migrate into the polymer particles, and polymerizing the monomer.

24. The method of claim 22, further comprising polymerizing the surface agent.

25. The process of claim 17, wherein the surface agent comprises a polyethylene glycol-based polymer, quaternary amine-based organic compound, polyvinylpyrrolidone- or polypyrrolidone-based surfactant, or an anionic surfactant with a sulfate anionic component.

26. The process of claim 17, wherein the surface agent comprises $SiH_{3-x}R^3_xR^4Q$, where x is 1, 2, or 3, $R^3$ is alkoxy, chloro, bromo, or iodo, $R^4$ is $C_3$-$C_{22}$ branched or unbranched alkylene or alkenylene or aromatic group and optionally includes an ether, ester, or amine linkage, and Q is H, Cl, Br, F, hydroxyl, carboxylic acid, epoxy, amine, or a substituted or unsubstituted vinyl, acrylate, or methacrylate.

27. The process of claim 17, wherein the aqueous dispersion in any step further comprises an ethylenically unsaturated monomer.

28. The process of claim 27, wherein the process further comprises a step of crosslinking the ethylenically unsaturated monomer to crosslink the polymer particles.

* * * * *

UNITED STATES PATENT AND TRADEMARK OFFICE
CERTIFICATE OF CORRECTION

PATENT NO. : 9,725,621 B2
APPLICATION NO. : 14/787989
DATED : August 8, 2017
INVENTOR(S) : Qingling Zhang et al.

It is certified that error appears in the above-identified patent and that said Letters Patent is hereby corrected as shown below:

At Column 35, Line 10, that portion of the sentence reading "CM'." should read -- CMP. --

Signed and Sealed this
Twenty-fourth Day of October, 2017

Joseph Matal
*Performing the Functions and Duties of the
Under Secretary of Commerce for Intellectual Property and
Director of the United States Patent and Trademark Office*